US010547116B2

(12) United States Patent
Pitsillides et al.

(10) Patent No.: US 10,547,116 B2
(45) Date of Patent: Jan. 28, 2020

(54) WIRELESS COMMUNICATION PARADIGM: REALIZING PROGRAMMABLE WIRELESS ENVIRONMENTS THROUGH SOFTWARE-CONTROLLED METASURFACES

(71) Applicant: UNIVERSITY OF CYPRUS, Aglantzia, Nicosia (CY)

(72) Inventors: Andreas Pitsillides, Larnaca (CY); Christos Liaskos, Salonika (GR); Angeliki Tsioliaridou, Salonika (GR); Sotirios Ioannides, Heraklon (GR); Ian Fuat Akyildiz, Alpharetta, GA (US)

(73) Assignee: UNIVERSITY OF CYPRUS (CY)

( * ) Notice: Subject to any disclaimer, the term of this patent is extended or adjusted under 35 U.S.C. 154(b) by 0 days.

(21) Appl. No.: 16/048,606

(22) Filed: Jul. 30, 2018

(65) Prior Publication Data
US 2019/0044246 A1 Feb. 7, 2019

Related U.S. Application Data

(60) Provisional application No. 62/539,831, filed on Aug. 1, 2017.

(51) Int. Cl.
*H01Q 3/44* (2006.01)
*H01Q 15/14* (2006.01)
(Continued)

(52) U.S. Cl.
CPC ......... *H01Q 15/148* (2013.01); *G02F 1/0126* (2013.01); *H01Q 3/46* (2013.01);
(Continued)

(58) Field of Classification Search
CPC ............. H04B 5/00; H01Q 15/00; H01Q 3/44
See application file for complete search history.

(56) References Cited

U.S. PATENT DOCUMENTS 5,917,446 A * 6/1999 Greenspan ............... H01Q 1/22
342/373
6,097,265 A * 8/2000 Chan ....................... H01P 5/103
333/245
(Continued)

OTHER PUBLICATIONS

Adnan Aijaz, Meryem Simsek, Mischa Dohler, Gerhard Fettweis: Shaping 5G for the Tactile Internet in 5G Mobile Communications. Springer, 2017.
(Continued)

*Primary Examiner* — Cindy Trandai
(74) *Attorney, Agent, or Firm* — Tarolli, Sundheim, Covell & Tummino LLP

(57) ABSTRACT

A system for controlling an interaction of a surface with an impinging electromagnetic wave is provided. The system comprises a surface comprising a plurality of controllable elements, wherein each of the controllable elements is configured to adjust its electromagnetic behavior based on a control signal received by the controllable element, a sensing unit configured to detect a state of an environment of the surface and/or one or more wave attributes of an electromagnetic wave impinging on the surface, a control unit configured to determine, based on the detected state of the environment and/or the one or more wave attributes, a control state of the controllable elements, in which the electromagnetic behavior of the controllable elements is adjusted such that the surface interacts with the impinging electromagnetic wave in a predefined manner, and an adjusting unit configured to determine.

16 Claims, 15 Drawing Sheets

(51) Int. Cl.

| | | |
|---|---|---|
| *H02N 99/00* | (2006.01) | |
| *H01Q 15/02* | (2006.01) | |
| *G02F 1/01* | (2006.01) | |
| *H04B 7/24* | (2006.01) | |
| *H01Q 17/00* | (2006.01) | |
| *H01Q 15/00* | (2006.01) | |
| *H01Q 3/46* | (2006.01) | |

(52) U.S. Cl.
CPC ........ *H01Q 15/002* (2013.01); *H01Q 15/0086* (2013.01); *H01Q 15/02* (2013.01); *H01Q 17/007* (2013.01); *H02N 99/00* (2013.01); *H04B 7/24* (2013.01); *G02F 2202/30* (2013.01); *G02F 2203/12* (2013.01)

(56) References Cited

U.S. PATENT DOCUMENTS

| | | | | |
|---|---|---|---|---|
| 7,352,941 | B2* | 4/2008 | Bratkovski | B82Y 20/00 356/480 |
| 8,320,661 | B2* | 11/2012 | Barbour | G01B 11/24 356/364 |
| 9,178,277 | B1* | 11/2015 | Moretti | H01Q 1/2216 |
| 9,473,220 | B2* | 10/2016 | Dinur | H04B 7/0404 |
| 9,652,643 | B1* | 5/2017 | Pesavento | H01Q 1/2216 |
| 2005/0110641 | A1* | 5/2005 | Mendolia | G01S 5/04 340/572.7 |
| 2006/0194544 | A1* | 8/2006 | Struckman | G01S 3/74 455/67.11 |
| 2007/0070358 | A1* | 3/2007 | Ouchi | G01S 17/875 356/614 |
| 2009/0212921 | A1* | 8/2009 | Wild | G01S 13/756 340/10.5 |
| 2010/0126767 | A1* | 5/2010 | Kotsubo | C23C 18/1608 174/389 |
| 2011/0098033 | A1 | 4/2011 | Britz et al. | |
| 2011/0155720 | A1* | 6/2011 | Woskov | B01J 19/12 219/601 |
| 2012/0326660 | A1 | 12/2012 | Lu et al. | |
| 2013/0135136 | A1* | 5/2013 | Haynes | G01S 13/89 342/22 |
| 2013/0218511 | A1* | 8/2013 | Mager | G01G 23/3735 702/129 |
| 2014/0072078 | A1* | 3/2014 | Sergeyev | H04B 7/086 375/316 |
| 2014/0349135 | A1* | 11/2014 | Oberhoffer | B32B 15/012 428/684 |
| 2015/0002270 | A1* | 1/2015 | Otis | A61B 5/0002 340/10.1 |
| 2015/0031297 | A1* | 1/2015 | Holman | H04W 8/005 455/41.2 |
| 2015/0171514 | A1 | 6/2015 | Chen et al. | |
| 2016/0219633 | A1* | 7/2016 | Verma | H04W 8/005 |
| 2016/0233971 | A1* | 8/2016 | Fink | H01Q 3/44 |
| 2017/0069967 | A1* | 3/2017 | Shrekenhamer | H01Q 9/0407 |
| 2017/0077335 | A1* | 3/2017 | Fiala | H01Q 1/248 |
| 2017/0346565 | A1* | 11/2017 | Dawson | H01Q 3/2676 |
| 2018/0115087 | A1* | 4/2018 | Besoli | H01Q 21/22 |
| 2018/0233821 | A1* | 8/2018 | Pham | H01Q 3/267 |
| 2018/0248267 | A1* | 8/2018 | Akselrod | B29D 11/00326 |
| 2018/0301821 | A1* | 10/2018 | Black | H01Q 21/293 |
| 2018/0323834 | A1* | 11/2018 | Jiang | H04B 7/0408 |

OTHER PUBLICATIONS

Paul Ferrand, Mustapha Amara, Stefan Valentin, Maxime Guillaud: "Trends and challenges in wireless channel modeling for evolving radio access", IEEE Communications Magazine, pp. 93-99, 2016.
Bo Han, Vijay Gopalakrishnan, Lusheng Ji, Seungjoon Lee: "Network function virtualization: Challenges and opportunities for innovations", IEEE Communications Magazine, pp. 90-97, 2015.
S. Han, K. G. Shin: Enhancing Wireless Performance Using Reflectors in Infocom 2017.
Kao-Cheng Huang, Zhaocheng Wang: Millimeter wave communcation systems. Wiley, 2011.
Younsun Kim, Hyoungju Ji, Juho Lee, Young-Han Nam, Boon Loong Ng, Ioannis Tzanidis, Yang Li, Jianzhong Zhang: "Full dimension mimo (FD-MIMO): the next evolution of MIMO in LTE systems", IEEE Wireless Communications, pp. 26-33, 2014.
Seung Hoon Lee, Muhan Choi, Teun-Teun Kim, Seungwoo Lee, Ming Liu, Xiaobo Yin, Hong Kyw Choi, Seung S. Lee, Choon-Gi Choi, Sung-Yool Choi, Xiang Zhang, Bumki Min: "Switching terahertz waves with gate-controlled active graphene metamaterials", Nature Materials, pp. 936-941, 2012.
Daecheon Lim, Dongju Lee, Sungjoon Lim: "Angle- and Polarization-Insensitive Metamaterial Absorber using Via Array", Scientific reports, pp. 39686, 2016.
S. Lucyszyn: Advanced RF MEMS. Cambridge University Press, 2010.
Alexander E. Minovich, Andrey E. Miroshnichenko, Anton Y. Bykov, Tatiana V. Murzina, Dragomir N. Neshev, Yuri S. Kivshar: "Functional and nonlinear optical metasurfaces: Optical metasurfaces", Laser & Photonics Reviews, pp. 195-213, 2015. URL http://doi.wiley.com/10.1002/lpor.201400402.
Marvin K. Simon, Mohamed-Slim Alouini: Digital communication over fading channels. John Wiley & Sons, 2005.
The~VISORSURF~project: "A Hardware Platform for Software-driven Functional Metasurfaces", Horizon 2020 Future Emerging Technologies, 2017. URL http://visorsurf.eu.
Christos Verikoukis, Roberto Minerva, Mohsen Guizani, Soumya Kanti Datta, Yen-Kuang Chen, Hausi A. Muller: "Internet of Things: Part 2", IEEE Communications Magazine, pp. 114-115, 2017.
Cheng-Xiang Wang, Xuemin Hong, Xiaohu Ge, Xiang Cheng, Gong Zhang, John Thompson: "Cooperative MIMO channel models: A survey", IEEE Communications Magazine, 2010.
Alexander Y. Zhu, Arseniy I. Kuznetsov, Boris Luk'yanchuk, Nader Engheta, Patrice Genevet: "Traditional and emerging materials for optical metasurfaces", Nanophotonics, 2017. URL http://www.degruyter.com/view/j/nanoph.2017.6.issue-2/nanoph-2016-0032/nanoph-2016-0032.xml.
C. L. Holloway, M. G. Cotton, and P. McKenna, "A model for predicting the power delay profile characteristics inside a room," IEEE Transactions on Vehicular Technology, vol. 48, No. 4, pp. 1110-1120, 1999.
M. K. Simon and M.-S. Alouini, Digital communication over fading channels. John Wiley & Sons, 2005, vol. 95.
C. L. Holloway, E. F. Kuester, J. A. Gordon, J. O'Hara, J. Booth, and D. R. Smith, "An Overview of the Theory and Applications of Metasurfaces: The Two-Dimensional Equivalents of Metamaterials," IEEE Antennas and Propagation Magazine, vol. 54, No. 2, pp. 10-35, 2012. [Online]. Available: http://ieeexplore.ieee.org/document/6230714/.
H.-T. Chen, A. J. Taylor, and N. Yu, "A review of metasurfaces: physics and applications," Reports on progress in physics. Physical Society (Great Britain), vol. 79, No. 7, p. 076401, 2016.
C. Liaskos, A. Tsioliaridou, A. Pitsillides, I. F. Akyildiz, N. Kantartzis, A. Lalas, X. Dimitropoulos, S. Ioannidis, M. Kafesaki, and C. Souk-oulis, "Design and Development of Software Defined Metamaterials for Nanonetworks," IEEE Circuits and Systems Magazine, vol. 15, No. 4, pp. 12-25, 2015.
K. Iwaszczuk, A. C. Strikwerda, K. Fan, X. Zhang, R. D. Averitt, and P. U. Jepsen, "Flexible metamaterial absorbers for stealth applications at terahertz frequencies," Optics Express, vol. 20, No. 1, p. 635, 2012.
A. E. Minovich, A. E. Miroshnichenko, A. Y. Bykov, T. V. Murzina, D. N. Neshev, and Y. S. Kivshar, "Functional and nonlinear optical metasurfaces: Optical metasurfaces," Laser & Photonics Reviews, vol. 9, No. 2, pp. 195-213, 2015. [Online]. Available: http://doi.wiley.com/10.1002/lpor.201400402.
B. Banerjee, An introduction to metamaterials and waves in composites. Boca Raton, FL: CRC Press/Taylor & Francis Group, 2011.
S. Lucyszyn, Advanced RF MEMS, ser. The Cambridge RF and mi-crowave engineering series. New York: Cambridge University Press, 2010.

(56) References Cited

OTHER PUBLICATIONS

Y. Kim, H. Ji, J. Lee, Y.-H. Nam, B. L. Ng, I. Tzanidis, Y. Li, and J. Zhang, "Full dimension mimo (FD-MIMO): the next evolution of MIMO in LTE systems," IEEE Wireless Communications, vol. 21, No. 2, pp. 26-33, 2014.

J. C. Lin, "Human Exposure to RF, Microwave, and Millimeter-Wave Electromagnetic Radiation [Health Effects]," IEEE Microwave Maga-zine, vol. 17, No. 6, pp. 32-36, 2016.

A. Chorti, S. M. Perlaza, Z. Han, and H. V. Poor, "Physical layer security in wireless networks with passive and active eavesdroppers," in Globecom 2012—2012 IEEE Global Communications Conference, pp. 4868-4873.

Y.B.Li,L.L.Li,B.B.Xu,W.Wu,R.Y.Wu,X.Wan,Q.Cheng, and T. J. Cui, "Transmission-Type 2-Bit Programmable Metasurface for Single-Sensor and Single-Frequency Microwave Imaging," Scientific reports, vol. 6, p. 23731, 2016.

H. Tao, A. C. Strikwerda, K. Fan, W. J. Padilla, X. Zhang, and R. D. Avert, "MEMS Based Structurally Tunable Metamaterials at Terahertz Frequencies," Journal of Infrared, Millimeter, and Terahertz Waves, vol. 32, No. 5, pp. 580-595, 2011.

T. Buckmann, N. Stenger, M. Kadic, J. Kaschke, A. Frolich, T. Kennerknecht, C. Eberl, M. Thiel, and M. Wegener, "Tailored 3D mechanical metamaterials made by dip-in direct-laser-writing optical lithography," Advanced materials, vol. 24, No. 20, pp. 2710-2714, 2012.

J. Jornet and I. Akyildiz, "Joint Energy Harvesting and Communication Analysis for Perpetual Wireless Nanosensor Networks in the Terahertz Band," IEEE Transactions on Nanotechnology, vol. 11, No. 3, pp. 570-580, 2012.

P. Theilmann, "Wireless power transfer for scaled electronic biomedical implants," Ph.D. dissertation, UC San Diego: b7322770, 2012.

K. Kantelis, S. Amanatiadis, C. Liaskos, N. Kantartzis, N. Konofaos, P. Nicopolitidis, and G. Papadimitriou, "On the Use of FDTD and Ray-Tracing Schemes in the Nanonetwork Environment," IEEE Communi-cations Letters, vol. 18, No. 10, pp. 1823-1826, 2014.

N. I. Zheludev and E. Plum, "Reconfigurable nanomechanical photonic metamaterials," Nature nanotechnology, vol. 11, No. 1, pp. 16-22, 2016.

J. D. Baena, J. Bonache, F. Martin, R. M. Sillero, F. Falcone, T. Lopetegi, M. A. G. Laso, J. Garcia-Garcia, I. Gil, M. F. Portillo et al., "Equivalent-circuit models for split-ring resonators and complementary split-ring resonators coupled to planar transmission lines," IEEE transactions on microwave theory and techniques, vol. 53, No. 4, pp. 1451-1461, 2005.

S. Luke, Essentials of metaheuristics, 1st ed. [S.I.]: Lulu, 2009.

J. Su, J. Liu, D. B. Thomas, and P. Y. K. Cheung, "Neural Network Based Reinforcement Learning Acceleration on FPGA Platforms," ACM SIGARCH Computer Architecture News, vol. 44, No. 4, pp. 68-73, 2017.

P. Rawat, K. D. Singh, H. Chaouchi, and J. M. Bonnin, "Wireless sensor networks: a survey on recent developments and potential synergies," The Journal of supercomputing, vol. 68, No. 1, pp. 1-48, 2014.

K. Xu, Q. Wang, H. Hassanein, and G. Takahara, "Optimal wireless sensor networks (WSNs) deployment: minimum cost with lifetime constraint," in Wireless and Mobile Computing, Networking and Com-munications, 2005. (WiMob'2005), IEEE International Conference on, vol. 3, 2005, pp. 454-461.

S. Abadal, M. Iannazzo, M. Nemirovsky, A. Cabellos-Aparicio, H. Lee, and E. Alarco'n, "On the Area and Energy Scalability of Wireless Network-on-Chip: A Model-Based Benchmarked Design Space Explo-ration," IEEE/ACM Transactions on Networking, p. 1, 2014.

S. Abadal, E. Alarco'n, A. Cabellos-Aparicio, M. Lemme, and M. Ne-mirovsky, "Graphene-enabled wireless communication for massive mul-ticore architectures," IEEE Communications Magazine, vol. 51, No. 11, pp. 137-143, 2013.

S. Deb, A. Ganguly, P. P. Pande, B. Belzer, and D. Heo, "Wireless NoC as Interconnection Backbone for Multicore Chips: Promises and Challenges," IEEE Journal on Emerging and Selected Topics in Circuits and Systems, vol. 2, No. 2, pp. 228-239, 2012.

J. Lehtomaki, A. Bicen, and I. Akyildiz, "On the Nanoscale Electromechanical Wireless Communication in the VHF Band," IEEE Transactions on Communications, p. 1, 2014.

F. Dressler and F. Kargl, "Towards security in nano-communication: Challenges and opportunities," Nano Communication Networks, vol. 3, No. 3, pp. 151-160, 2012.

C. Liaskos, A. Tsioliaridou, S. Ioannidis, N. Kantartzis, and A. Pit-sillides, "A Deployable Routing System for Nanonetworks," in IEEE ICC'16, 2016, pp. 1-6.

A. Tsioliaridou, C. Liaskos, E. Dedu, and S. Ioannidis, "Packet Rout-ing in 3D Nanonetworks: A Lightweight, Linear-path Scheme," Nano Communication Networks, vol. PP, p. PP, 2017.

H. Kim and N. Feamster, "Improving network management with soft-ware defined networking," IEEE Communications Magazine, vol. 51, No. 2, pp. 114-119, 2013.

C. Liaskos, V. Kotronis, and X. Dimitropoulos, "A novel framework for modeling and mitigating distributed link flooding attacks," in IEEE Infocom 2016—IEEE Conference on Computer Communications, pp. 1-9.

European Search Report for App lication No. 18186564.3-1205 dated Dec. 3, 2018.

\* cited by examiner

Lens effect with negative reflection angle

WIRELESS COMMUNICATION PARADIGM: REALIZING PROGRAMMABLE WIRELESS ENVIRONMENTS THROUGH SOFTWARE-CONTROLLED METASURFACES

RELATED APPLICATION DATA

This application is a U.S. Non-Provisional application claiming priority to U.S. Provisional application No. 62/539,831, filed on 1 Aug. 2017. The Entirety of which is incorporated herein by reference.

TECHNICAL FIELD

The present disclosure generally relates to a technique for controlling an interaction of a surface with an impinging electromagnetic wave. In particular, methods and devices are disclosed for controlling an interaction of a surface with an impinging electromagnetic wave, wherein the electromagnetic wave can be, without limitation, an electromagnetic wave used for wireless communication between a transmitter and a receiver. The electromagnetic wave may include, e.g., a radio wave or microwave in a frequency spectrum commonly used for wireless communication and/or an optical wave in the infrared, the visible, and/or the ultraviolet frequency spectrum.

BACKGROUND

The efficiency of wireless communications is dictated by the effects of the environment, including the set of objects whose geometry, position and composition define the propagation paths of electromagnetic waves, and the severity of effects such as multi-path fading and path loss. Accounting for these effects is an intractable problem in almost all but the simplest cases.

SUMMARY

Accordingly, there is a need for a technique which solves the above problem or other related problems of prior art techniques. Specifically, and without limitation, there is a need for a technique that improves the quality of wireless communication between a transmitter and a receiver, taking into account the composition of the environment and/or possible propagation paths of an electromagnetic wave.

According to a first aspect, a system for controlling an interaction of a surface with an impinging electromagnetic wave is provided. The system comprises a surface comprising a plurality of controllable elements, wherein each of the controllable elements is configured to adjust its electromagnetic behavior based on a control signal received by the controllable element, a sensing unit configured to detect a state of an environment of the surface and/or one or more wave attributes of an electromagnetic wave impinging on the surface, a control unit configured to determine, based on the detected state of the environment and/or the one or more wave attributes, a control state of the controllable elements, in which the electromagnetic behavior of the controllable elements is adjusted such that the surface interacts with the impinging electromagnetic wave in a predefined manner, and an adjusting unit configured to determine, based on the control state determined by the control unit, control signals to be transmitted to the controllable elements, which cause the controllable elements to adjust their electromagnetic behavior according to the control state, wherein the adjusting unit is further configured to transmit the control signals to the controllable elements.

The following description may apply to all aspects described in this disclosure. In particular, the following description concerning the system aspects may not only apply to the system aspects but also to the device aspect and the method aspects described below, where applicable. Further, the following description concerning the system aspects according to the first aspect may also apply to the control unit aspects according to the second aspect, to the device aspect according to the third aspect, to the system aspect according to the fourth aspect, as well as to the corresponding method aspects according to the fifth and sixth aspects, where applicable.

The present application is not limited to one specific communication technology or standard (e.g., WLAN). The described electromagnetic wave may be an electromagnetic wave transmitted in any suitable kind of wireless communication network, including a WLAN according to the standard family IEEE 802.11 (e.g., IEEE 802.11a, g, n, ax or ac; also referred to as Wi-Fi), a Worldwide Interoperability for Microwave Access (WiMAX) according to the standard family IEEE 802.16, an adhoc Personal Area Network (PAN) such as, e.g., Zigbee or Bluetooth, a Wireless Sensor Network (WSN) and the Internet of Things (IoTs) and/or a wireless network operating under a 3rd Generation Partnership Project (3GPP) standard, such as LTE, advanced LTE, 5G, or any other wireless/mobile communication standard. Therefore, the electromagnetic wave may be a radio wave or a microwave in a frequency spectrum with wavelengths longer than infrared light. Further, the electromagnetic wave may also be an optical wave in the infrared, the visible, and/or the ultraviolet frequency spectrum. In other words, the expression "electromagnetic wave" used herein is not limited to a particular frequency spectrum or frequency band. E.g., optical and non-optical waves may be covered by the expression "electromagnetic wave". Therefore, the electromagnetic wave may be used for wireless, optical communication.

A transmitter of the electromagnetic wave may be any wireless device in the wireless communication network. The same holds for a receiver of the electromagnetic wave. In particular, the transmitter and/or the receiver may be a network node and, more specifically, may be an Access Point (AP) of a WLAN network, a base station, Node B or eNodeB operating under a 3GPP standard, or a wireless a-hoc node, such as, e.g., a Wireless Sensor Node or a Vehicle Ad-hoc Network Node (VANET). Further, the transmitter and/or the receiver of the electromagnetic wave may be any wireless device in a wireless communication network, and, more specifically, a station (STA) of a WLAN, a User Equipment (UE) of a 3GPP wireless communication network, an ad-hoc wireless node, or any other wireless/mobile communication device.

The surface may be a two-dimensional surface and, in particular, any two-dimensional surface. The surface may cover a wall (e.g., an inside wall or an outside wall) of a building or an exterior surface of an everyday object. Thus, the surface may represent an intelligent surface. In particular, an aspect of the present disclosure is directed to a building comprising a wall, wherein the surface described in the above first aspect is arranged on the wall of the building.

The controllable elements may be arranged in a repeating pattern, e.g., in a two-dimensional matrix. Further, the controllable elements may be arranged on tiles, wherein each tile comprises one or more of the controllable elements.

The tiles may have a rectangular shape. A plurality of controllable elements may be arranged in a repeating pattern on a tile. The tile may be substantially two-dimensional, i.e., a thickness (in a z-direction) of the tile is much smaller (i.e., at least 5 times or at least 10 times) than a width (in an x-direction) and a height (in a y-direction) of the tile. The tile may be configured to be attached to a wall, e.g., a wall of a building and/or a wall of an object.

A dimension of each of the controllable elements may be smaller than a wavelength of the impinging electromagnetic wave. For example, the dimension may be 2 times smaller, 5 times smaller, or 10 times smaller than the wavelength of the impinging electromagnetic wave. The dimension may be a width of the controllable element measured in a direction parallel to the surface. The dimension may be a diameter of the controllable element. For example, a dimension of each of the controllable elements may be smaller than 10 cm or smaller than 1 cm or even smaller than 0.5 cm.

The control signal may be an electrical, an optical and/or a mechanical control signal. The sensing unit may be arranged on the surface together with the controllable elements. For example, the sensing unit may be arranged on a two-dimensional surface between the controllable elements. Further, the sensing unit may be arranged in a layer behind (in a z-direction) the controllable elements. Still further, the controllable elements may be configured to perform a function of the sensing unit. The sensing unit may comprise a plurality of sensors. The plurality of sensors may be distributed over the surface. Further, the sensing unit may comprise one or more remote sensors arranged remote from the surface. In this disclosure, "remote from the surface" may mean that the respective remote sensor is not arranged directly on the surface but provided with a distance to the surface, which is larger than zero. The one or more remote sensors are part of the sensing unit and are communicatively coupled to the control unit. For example, the remote sensors may be distributed over the environment of the surface. The environment of the surface may be defined as an area in front of the surface and/or an area in the vicinity of the surface. The one or more remote sensors may be part of a device external to the surface, such as a wireless device. The one or more remote sensors may be free standing. For example, the one or more remote sensors may be configured to determine a state of the environment, such as at least one of a position of a transmitter of the electromagnetic wave, an orientation of a transmitter of the electromagnetic wave, a mobility pattern of a transmitter of the electromagnetic wave, and a device type identification of a transmitter of the electromagnetic wave.

The state of the environment may determine a state of a controlled variable of the system, as for example the quality of the received signal in a receiver, and can include at least one of an estimated position of a transmitter of the electromagnetic wave, a mobility pattern of a transmitter of the electromagnetic wave, and a device type identification of a transmitter of the electromagnetic wave.

The control unit may comprise a CPU and/or a memory. The control unit may comprise a server connected in a local network. Further, the control unit may comprise a remote server connected to the Internet, and even a cloud based service such as Software or Infrastructure as a Service (SaaS, IaaS). For example, the control unit may comprise a local control unit and an external control unit, wherein the local control unit and the external control unit are connected to a network, such as the Internet. In this case, the sensing unit and the control elements may be connected to the local control unit. The control unit may comprise a controller network. The controller network may be connected to the Internet.

The controllable elements may be configured to adjust their electromagnetic behavior by changing their electrical conductivity properties. More specifically, the controllable elements may be configured to change their electromagnetic behavior by changing a shape of a continuous conductive surface of the respective controllable element. Switches may be provided between individual controllable elements, which can be switched in a conductive state and in an isolating state, wherein the electromagnetic behavior of the controllable elements is changed. The electromagnetic behavior may refer to, e.g., a permittivity and/or a permeability of the controllable elements. Even though it is referred herein to the "electromagnetic behavior of the controllable elements" it should be appreciated that this behavior does not necessarily refer to the behavior of one isolated controllable element but rather to the behavior of the plurality of controllable elements, which cooperate in order to exhibit the desired electromagnetic behavior.

The control state may refer to a given state of the plurality of controllable elements, such as a switching state of switches of the controllable elements. In other words, the controllable elements may have a plurality of states, such as switching states or mechanical orientations, wherein the control state refers to one overall state of these individual states of the controllable elements. For example, one predefined control state may cause one predefined electromagnetic behavior of the plurality of controllable elements.

The adjusting unit may be arranged together with the control unit as one overall control unit. The adjusting unit may also be referred to as a gateway, a tile gateway, or an Internet-of-Things (IoT) gateway in this disclosure. Further, the adjusting unit may be arranged as one individual unit communicatively coupled to the control unit. Further, a plurality of adjusting units may be provided. For example, for a predetermined number of controllable elements, one corresponding adjusting unit may be provided, i.e., be part of the system.

In case the controllable elements are arranged on tiles, an adjusting unit may be provided for each tile. The adjusting units may be configured to receive and transmit signals from and to each other. The adjusting units may be configured to form a wired or wireless network. The network may be an ad-hoc network, e.g., in a grid topology.

The surface may comprise a plurality of controller domains, each controller domain comprising one or more of the controllable elements. The system may comprise, for each controller domain, an adjusting unit configured to determine control signals for the controllable elements of the respective controller domain and to transmit the control signals to the controllable elements of the respective controller domain.

In this way, each adjusting unit may perform control for one selected subgroup of the plurality of controllable elements. The adjusting units may each be connected to the control unit. For example, the adjusting units may be connected to the control unit via a network. The plurality of controllable elements may be arranged on tiles. For example, a plurality of controllable elements may be provided on one tile and one adjusting unit may be provided for the controllable elements of the tile. Thus, the controllable elements of one tile may form a controller domain. The adjusting units of the different controller domains may be configured to communicate with each other (e.g., either directly or via the control unit). For example, the adjusting units of the different controller domains may be configured to form a network (e.g., an ad-hoc network) and, in particular, a wired or wireless ad-hoc network (optionally in a grid topology).

Each controller domain may further comprise one or more sensors of the sensing unit, wherein the adjusting unit of each controller domain is configured to receive a sensor signal from the one or more sensors of the respective controller domain and to transmit a signal indicative of the sensor signal and/or indicative of the state of the environment and/or the one or more wave attributes to the control unit.

The adjusting units may function independently from each other or may be communicatively connected with each other and configured to exchange control signals with each other.

The controllable elements may form a meta-atom canvas comprising a plurality of tunable meta-atoms. The meta-atom canvas may form an electromagnetic metasurface for the impinging electromagnetic wave.

Herein, the expressions "meta-atom" and/or "electromagnetic metasurface" may have the common meaning assigned to these expressions in the literature in the field. The meta-atoms may be tunable in a way that their electromagnetic behavior may be changed. In this disclosure, the expression electromagnetic behavior may refer to an interaction with an electromagnetic wave. More precisely, the electromagnetic behavior may refer to details regarding how an impinging electromagnetic wave is reflected, absorbed, and/or polarized.

The plurality of controllable elements may comprise at least one of metallic patches and CMOS- or graphene-switches arranged between the metallic patches, MEMS actuators, and, optionally, THz designs tuned by MEMS actuators, magnetoelastic microwave metamaterials, and, optionally, magnetoelastic microwave metamaterials configured to be driven by Ampere's force, reconfigurable optical metadevices based on flexible strips or nanowires cut from membranes of nanoscale thickness, thermally reconfigurable metasurfaces configured to be driven by differential thermal expansion between gold and silicon nitride layers, electro-optical modulator metasurface configured to be driven by electrostatic forces between oppositely charged nanowires, all-optical modulator plasmonic metasurface configured to be actuated by a milliwatt of light power at telecom wavelengths, spatial light modulators, electrically addressable metadevices, randomly reconfigurable in one dimension, and digital metasurfaces configured to be switched between two opposite electromagnetic states.

The sensing unit may comprise a plurality of sensors arranged on the surface. Additionally or alternatively, the sensing unit may comprise one or more remote sensors arranged in the environment of the surface. A combination of remote sensors and sensors arranged on the surface may be provided.

The one or more wave attributes may comprise at least one of a phase, a power and an incident direction of the impinging electromagnetic wave.

The sensing unit may further comprise at least one remote sensor arranged remote from the surface. The remote sensor is configured to detect the state of the environment. The state of the environment may be at least one of a position of a transmitter of the electromagnetic wave, an orientation of a transmitter of the electromagnetic wave, a mobility pattern of a transmitter of the electromagnetic wave, and a device type identification of a transmitter of the electromagnetic wave. The remote sensor may comprise at least a camera.

For example, the remote sensor may comprise a camera and may be configured to optically detect the state of the environment. For example, the remote sensor may be configured to identify a device type of the transmitter (such as a model type of mobile device). Based on the state of the environment, the control unit may derive information regarding the impinging electromagnetic wave (such as orientation, frequency, signal strength, etc.). For example, when the control unit knows the device type identification of the transmitter, a frequency of the electromagnetic wave may be derived from that information.

The predefined manner may comprise at least one of wave steering into a predefined direction, and, optionally, reflecting or refracting the impinging electromagnetic wave from a given incident direction towards a direction dependent on the changed electromagnetic behavior of the controllable elements, lens functionality, and, optionally, focusing the impinging electromagnetic wave towards a predefined remote point, wave absorbing, and, optionally, ensuring minimal reflected and/or refracted power for the impinging electromagnetic wave, and wave polarizing, and, optionally, changing an oscillation direction of an electromagnetic field of the impinging electromagnetic wave (i.e., changing a polarization of the electromagnetic wave).

The control unit may be configured to determine, based on the state of the environment and/or the one or more wave attributes detected by the sensing unit, an incident direction of the impinging electromagnetic wave with regard to the surface.

Thus, the wave attributes (e.g., phase and/or power of the electromagnetic wave) may be representative of an incident direction of the electromagnetic wave, such that the incident direction can be derived (or at least estimated) from the wave attributes. Further, the control unit may be configured to derive an incident direction of the electromagnetic wave, based on the wave attributes and based on information output by the at least one additional sensor.

The control unit may be configured to determine the control state based on the determined incident direction, such that the electromagnetic wave is reflected towards a predefined reflection direction.

The predefined reflection direction may be defined by a vector in the three-dimensional space. The predefined reflection direction may be an "unnatural" reflection direction, such that an angle of incidence of the electromagnetic wave with regard to a normal of the surface is not identical to an angle of reflection with regard to the normal of the surface.

The control unit may be configured to determine the control state based on the determined incident direction, such that the electromagnetic wave is focused at a predefined focal point.

The control unit may be configured to determine the control state based on a known position of an object. The control state may be determined such that the electromagnetic wave, after impinging on the surface, does not impinge on a surface of the object.

The object may be opaque with regard to the electromagnetic wave.

The object may be located between a transmitter of the electromagnetic wave and a known position of a receiver of the electromagnetic wave. The control state may be determined such that a propagation path of the electromagnetic wave, after impinging on the surface, is steered around the object.

According to the entire present disclosure, a transmitter of the electromagnetic wave may be, e.g., a base station, a Node B, an eNodeB, an Access Point (AP), a User Equipment, a mobile device, a wireless ad-hoc node, or a station (STA). Similarly, a receiver of the electromagnetic wave may be, e.g., a base station, a Node B, an eNodeB, an Access Point (AP), a User Equipment, a mobile device, a wireless ad-hoc node, or a station (STA).

The control unit may be configured to determine the control state such that a plurality of propagation paths is formed between a transmitter of the electromagnetic wave and a receiver of the electromagnetic wave, wherein one of the propagation paths carries considerable more power than the other propagation paths.

Considerable more power may mean, e.g., at least two times more power, at least 5 times more power or at least 10 times more power.

The system may further comprise a mobile device detecting unit configured to detect a presence of one or more mobile devices in the vicinity of the system. The control unit may be configured to determine the control state based on an output of the mobile device detecting unit.

The surface may comprise an energy harvesting antenna, which is configured to convert part of the energy of the impinging electromagnetic wave into electric energy. The energy harvesting antenna may be connected to the control unit and configured to supply the electric energy to the control unit.

Further, the system may comprise an energy storage for storing energy converted by the energy harvesting antenna.

The control unit may be configured to, in a calculated or learning process (or adaptive process), determine a control state of the controllable elements, receive sensor data from an external and/or an internal sensor regarding the state of the environment and/or a reflected electromagnetic wave reflected on the plurality of controllable elements, adjust the control state of the controllable elements based on the received sensor data in a calculated or iterative process, such that the surface interacts with the impinging electromagnetic wave in a predefined manner and such that the reflected electromagnetic wave exhibits a predefined behavior, and store information indicative of the control state in a memory of the control unit.

Thereby, the control states in order to achieve a predefined electromagnetic behavior, may be calculated based on a control algorithm or iteratively learned by the control unit. The expression "learning process" is not considered to be limiting but merely means that the steps defined above are performed within one and the same process, e.g., during a configuration of the system. For example, the learning process may be performed after the system has been set up.

According to a second aspect, a control unit for controlling an interaction of a surface with an impinging electromagnetic wave is provided. The control unit is configured to receive information indicative of a state of an environment of the surface and/or one or more wave attributes of an electromagnetic wave impinging on a surface, determine, based on the state of the environment and/or the one or more wave attributes, a control state of a plurality of controllable elements, in which the electromagnetic behavior of the controllable elements is adjusted such that the surface interacts with the impinging electromagnetic wave in a predefined manner, and output information indicative of the control state.

The information indicative of one or more wave attributes of the electromagnetic wave may be indicative of at least one of a phase, a power and an incident direction of the impinging electromagnetic wave.

Further, the details discussed above with regard to the first aspect may also apply to the control unit of the second aspect, where appropriate.

According to a third aspect, a device for controlling an interaction of a surface with an impinging electromagnetic wave is provided. The device comprises a surface comprising a plurality of controllable elements, wherein each of the controllable elements is configured to adjust its electromagnetic behavior based on a control signal received by the controllable element, and an adjusting unit configured to determine control signals to be transmitted to the controllable elements, which cause the controllable elements to adjust their electromagnetic behavior according a predefined control state, wherein the adjusting unit is further configured to transmit the control signals to the controllable elements.

The details discussed above with regard to the first and the second aspect may also apply to the device of the third aspect, where appropriate. In particular, the details regarding the controllable elements and the adjusting unit discussed above, may also apply to the controllable elements and the adjusting unit of the device of the third aspect. In particular, the device of the third aspect may be directed to a "tile" described in this disclosure.

The device may further be configured to receive information indicative of the predefined control state. The device may receive the information, e.g., from an external control device (e.g., via the Internet). Further, the device may receive the information via a suitable interface from another device.

The device may comprise an interface configured to be communicatively coupled with an interface of another device having a surface comprising a plurality of controllable elements, wherein the adjusting unit is configured to receive and transmit signals from and to an adjusting unit of the another device. Thereby, the plurality of devices may represent a network of devices, wherein each of the devices has a similar hardware configuration. The device may comprise a mechanical connector configured to attach the device to another device, such that the device and the another device form a continuous surface of controllable elements.

According to a fourth aspect, a system comprising a plurality of devices according to the third aspect is provided. Each of the plurality of devices comprises an adjusting unit configured to communicate with an adjusting unit of at least one of the other devices of the plurality of devices. The details discussed above with regard to the devices of the third aspect may also apply to the devices of the system of the fourth aspect. Each of the devices of the system may comprise a mechanical connector configured to attach the device to another device of the plurality of devices, such that the plurality of devices forms a continuous surface of controllable elements. The adjusting units of the plurality of devices may be configured to form an ad-hoc network.

According to a fifth aspect, a method for controlling an interaction of a surface with an impinging electromagnetic wave is provided. The method comprises receiving an electromagnetic wave at a surface comprising a plurality of controllable elements, wherein each of the controllable elements is configured to adjust its electromagnetic behavior based on a control signal received by the controllable element, detecting, by a sensing unit, a state of an environment of the surface and/or one or more wave attributes of the electromagnetic wave impinging on the surface, determining, by a control unit, based on the detected state of the environment and/or the one or more wave attributes, a control state of the controllable elements, in which the electromagnetic behavior of the controllable elements is adjusted such that the surface interacts with the impinging electromagnetic wave in a predefined manner, determining, by an adjusting unit, based on the control state, control signals to be transmitted to the controllable elements, which cause the controllable elements to adjust their electromagnetic behavior according to the control state, and transmitting, by the adjusting unit, the control signals to the controllable elements.

The method according to the fifth aspect may be carried out by the system according to the first aspect.

The surface may comprise a plurality of controller domains, each controller domain comprising one or more of the controllable elements. The system may comprise, for each controller domain, an adjusting unit. The method may comprise determining, by the adjusting unit, control signals for the controllable elements of the respective controller domain, and transmitting, by the adjusting unit, the control signals to the controllable elements of the respective controller domain Each controller domain may further comprise one or more sensors of the sensing unit. The method may further comprise receiving, by the adjusting unit, a sensor signal from the one or more sensors of the respective controller domain, and transmitting, by the adjusting unit, a signal indicative of the sensor signal and/or indicative of the one or more wave attributes to the control unit.

The controllable elements may form a meta-atom canvas comprising a plurality of tunable meta-atoms. The meta-atom canvas may form an electromagnetic metasurface for the impinging electromagnetic wave.

The plurality of controllable elements may comprise at least one of metallic patches and CMOS- or graphene-switches arranged between the metallic patches, MEMS actuators, and, optionally, THz designs tuned by MEMS actuators, magnetoelastic microwave metamaterials, and, optionally, magnetoelastic microwave metamaterials driven by Ampere's force, reconfigurable optical metadevices based on flexible strips or nanowires cut from membranes of nanoscale thickness, thermally reconfigurable metasurfaces driven by differential thermal expansion between gold and silicon nitride layers, electro-optical modulator metasurface driven by electrostatic forces between oppositely charged nanowires, all-optical modulator plasmonic metasurface actuated by a milliwatt of light power at telecom wavelengths, spatial light modulators, electrically addressable metadevices, randomly reconfigurable in one dimension, and digital metasurfaces switched between two opposite electromagnetic states.

The sensing unit may comprise a plurality of sensors arranged on the surface.

The one or more wave attributes may comprise at least one of a phase and a power of the impinging electromagnetic wave.

At least one remote sensor may be provided. The remote sensor is arranged remote from the surface. The remote sensor is configured to detect the state of the environment. The state of the environment may be at least one of a position of a transmitter of the electromagnetic wave, an orientation of a transmitter of the electromagnetic wave, a mobility pattern of a transmitter of the electromagnetic wave, and a device type identification of a transmitter of the electromagnetic wave.

The predefined manner may comprise at least one of wave steering into a predefined direction, and, optionally, reflecting or refracting the impinging electromagnetic wave from a given incident direction towards a direction dependent on the changed electromagnetic behavior of the controllable elements, lens functionality, and, optionally, focusing the impinging electromagnetic wave towards a predefined remote point, wave absorbing, and, optionally, ensuring minimal reflected and/or refracted power for the impinging electromagnetic wave, and wave polarizing, and, optionally, changing an oscillation direction of an electromagnetic field of the impinging electromagnetic wave.

The method may further comprise determining, based on the state of the environment and/or the one or more wave attributes detected by the sensing unit, an incident direction of the impinging electromagnetic wave with regard to the surface.

The control state may be determined based on the determined incident direction, such that the electromagnetic wave is reflected towards a predefined reflection direction.

The control state may be determined based on the determined incident direction, such that the electromagnetic wave is focused at a predefined focal point.

The control state may be determined based on a known position of an object. The control state may be determined such that the electromagnetic wave, after impinging on the surface, does not impinge on a surface of the object.

The object may be located between a transmitter of the electromagnetic wave and a known position of a receiver of the electromagnetic wave. The control state may be determined such that a propagation path of the electromagnetic wave, after impinging on the surface, is steered around the object.

The control unit may be configured to determine the control state such that a plurality of propagation paths is formed between a transmitter of the electromagnetic wave and a receiver of the electromagnetic wave, wherein one of the propagation paths carries considerable more power than the other propagation paths.

The system may further comprise a mobile device detecting unit. The method may further comprise detecting, by the mobile device detecting unit, a presence of one or more mobile devices in the vicinity of the system, wherein the control state is determined based on an output of the mobile device detecting unit.

The surface may comprise an energy harvesting antenna. The method may further comprise converting, by the energy harvesting antenna, part of the energy of the impinging electromagnetic wave into electric energy and supplying the electric energy to the control unit.

The method may further comprise, in a calculated or learning process, determining a control state of the controllable elements, receiving sensor data from an external and/or an internal sensor regarding the state of the environment and/or a reflected electromagnetic wave reflected on the plurality of controllable elements, adjusting the control state of the controllable elements based on the received sensor data in a calculated or iterative process, such that the surface interacts with the impinging electromagnetic wave in a predefined manner and such that the reflected electromagnetic wave exhibits a predefined behavior, and storing information indicative of the control state in a memory of the control unit.

According to a sixth aspect, a method for controlling an interaction of a surface with an impinging electromagnetic wave is provided. The method comprises receiving information indicative of a state of an environment of the surface and/or one or more wave attributes of an electromagnetic wave impinging on a surface, determining, based on the state of the environment and/or the one or more wave attributes, a control state of a plurality of controllable elements, in which the electromagnetic behavior of the controllable elements is adjusted such that the surface interacts with the impinging electromagnetic wave in a predefined manner, and outputting information indicative of the control state.

The method according to the sixth aspect may be carried out by the control unit according to the second aspect.

The information indicative of one or more wave attributes of the electromagnetic wave may be indicative of at least one of a phase, a power and an incident direction of the impinging electromagnetic wave. Further, the information indicative of a state of an environment of the surface may be at least one of a position of a transmitter of the electromagnetic wave, an orientation of a transmitter of the electromagnetic wave, a mobility pattern of a transmitter of the electromagnetic wave, and a device type identification of a transmitter of the electromagnetic wave.

According to a seventh aspect, a computer program product is provided. The computer program product comprises program code portions to perform the steps of any of the methods described in this disclosure when the computer program product is executed on one or more processing devices.

The computer program product may be stored on one or more computer-readable recording media, such as, e.g., optical recording media, magnetic recording media, solid state recording media, etc.

BRIEF DESCRIPTION OF THE DRAWINGS

Further details of embodiments of the technique are described with reference to the enclosed drawings, wherein.

DETAILED DESCRIPTION

Figure 1:
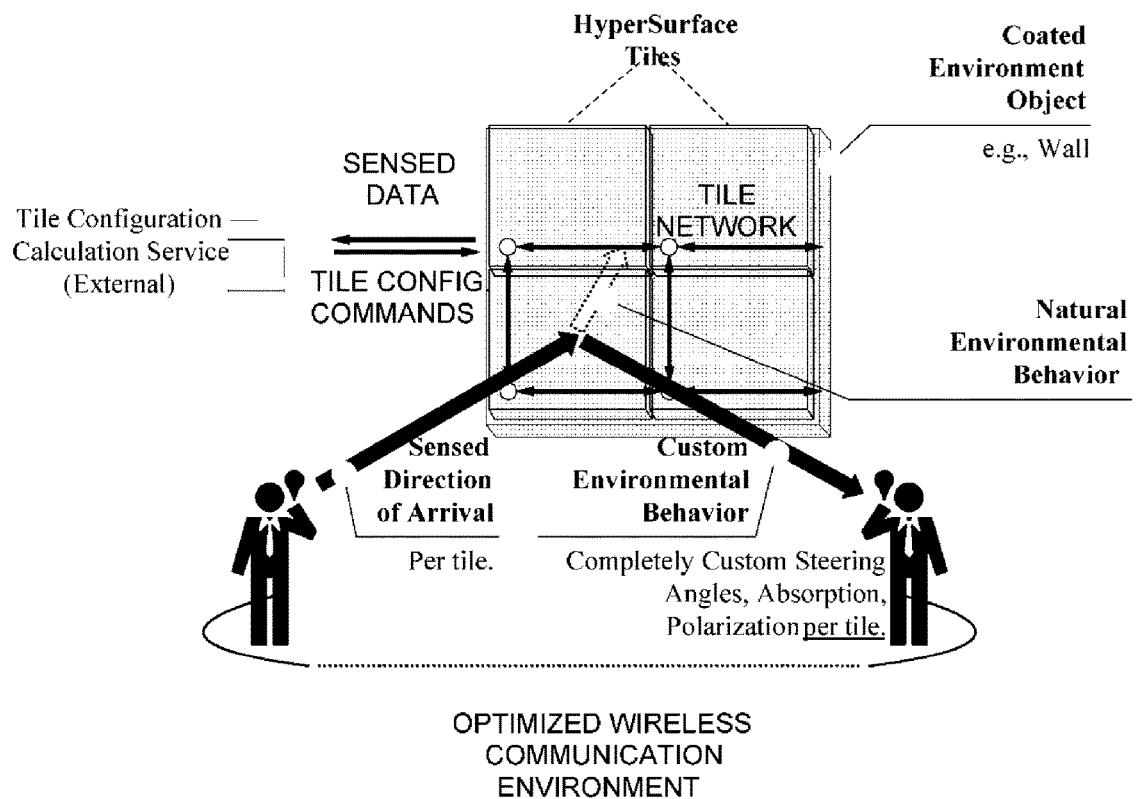
FIG. 1 shows an illustration of the novel wireless environment paradigm employing HyperSurfaces described herein, wherein it is shown that the wireless propagation can be optimized per communication link, using even unnatural, negative reflection angles, full absorption from all angles, and more.

In the following description, for purposes of explanation and not limitation, specific details are set forth, such as a specific network environment and specific geometries in order to provide a thorough understanding of the technique disclosed herein. It will be apparent to one skilled in the art that the technique may be practiced in other embodiments that depart from these specific details.

Moreover, those skilled in the art will appreciate that the services, functions, steps and units explained herein may be implemented using software functioning in conjunction with a programmed microprocessor, an Application Specific Integrated Circuit (ASIC), customized electronic components, a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the embodiments may also be embodied in a computer program product as well as in a system comprising a computer processor and memory coupled to the processor, wherein the memory is encoded with one or more programs that may perform the services, functions, steps and implement the units disclosed herein.

The references indicated in square brackets are listed in the "References" section below. Each of the cited references is incorporated herein in its entirety. More precisely, the references are incorporated in their entirety in the context of the part of the description, where the citation occurs.

Electromagnetic waves undergo multiple uncontrollable alterations as they propagate within a wireless environment. Free space path loss, signal absorption, as well as reflections, refractions and diffractions caused by physical objects within the environment highly affect the performance of wireless communications. Currently, such effects are intractable to account for and are normally treated as probabilistic factors. The present disclosure proposes a radically different approach, enabling deterministic, programmable control over the behavior of the wireless environments. The key-enabler is the so-called HyperSurface tile, a novel class of planar meta-materials which can interact with impinging electromagnetic waves in a controlled manner. The Hyper-Surface tiles can steer electromagnetic waves towards any desired direction, can achieve full absorption and polarization. Multiple tiles are employed to coat objects such as walls, furniture, overall, any objects in the indoor and outdoor environments. An external software service calculates and deploys the optimal interaction types per tile, to best fit the needs of communicating devices.

Wireless communications are rapidly evolving towards a software-based functionality paradigm, where every part of the device hardware can adapt to the changes in the environment. Beamforming-enabled antennas, cognitive spectrum usage, adaptive modulation and encoding are but a few of the device aspects that can now be tuned to optimize the communication efficiency [1]. In this optimization process, however, the environment remains an uncontrollable factor: it remains unaware of the communication process undergoing within it. In this disclosure, a technique is provided which makes the environmental effects controllable and optimizable via hardware and software.

A wireless environment is defined as the set of physical objects that significantly alter the propagation of electromagnetic (EM) waves among communicating devices. In general, emitted waves undergo attenuation and scattering before reaching an intended destination. Attenuation is owed to material absorption losses, and the natural spreading of power within space, i.e., the distribution of power over an ever-increasing spherical surface. Wave scattering is owed to the diffraction, reflection and refraction phenomena, which result into a multiplicity of propagation paths between devices. The geometry, positioning and composition of objects define the propagation outcome, which is, however, intractable to calculate except for simple cases.

Apart from being uncontrollable, the environment has generally a negative effect on the communication efficiency. The signal attenuation limits the connectivity radius of nodes, while multi-path propagation results into fading phenomena, a well-studied effect which introduces drastic fluctuations in the received signal power. The signal deterioration is perhaps the major consideration in forthcoming mm-wave and THz communications. While these extremely high communication frequencies offer unprecedented data rates and device size minimization, they suffer from acute attenuation owed to molecular absorption, multi-path fading and Doppler shift even at pedestrian speeds, limiting their present use in short line-of-sight distances [2]. Existing mitigation approaches propose massive MIMO and 3D beamforming at the device-sides [3], and passive reflectors carefully placed within the environment [4]. However, both approaches keep the environment unaware of the ongoing communications. As a result, the channel model remains uncontrollable and continues to be treated probabilistically. Thus, the core communication problem remains unsolved in the prior art.

Figure 2:
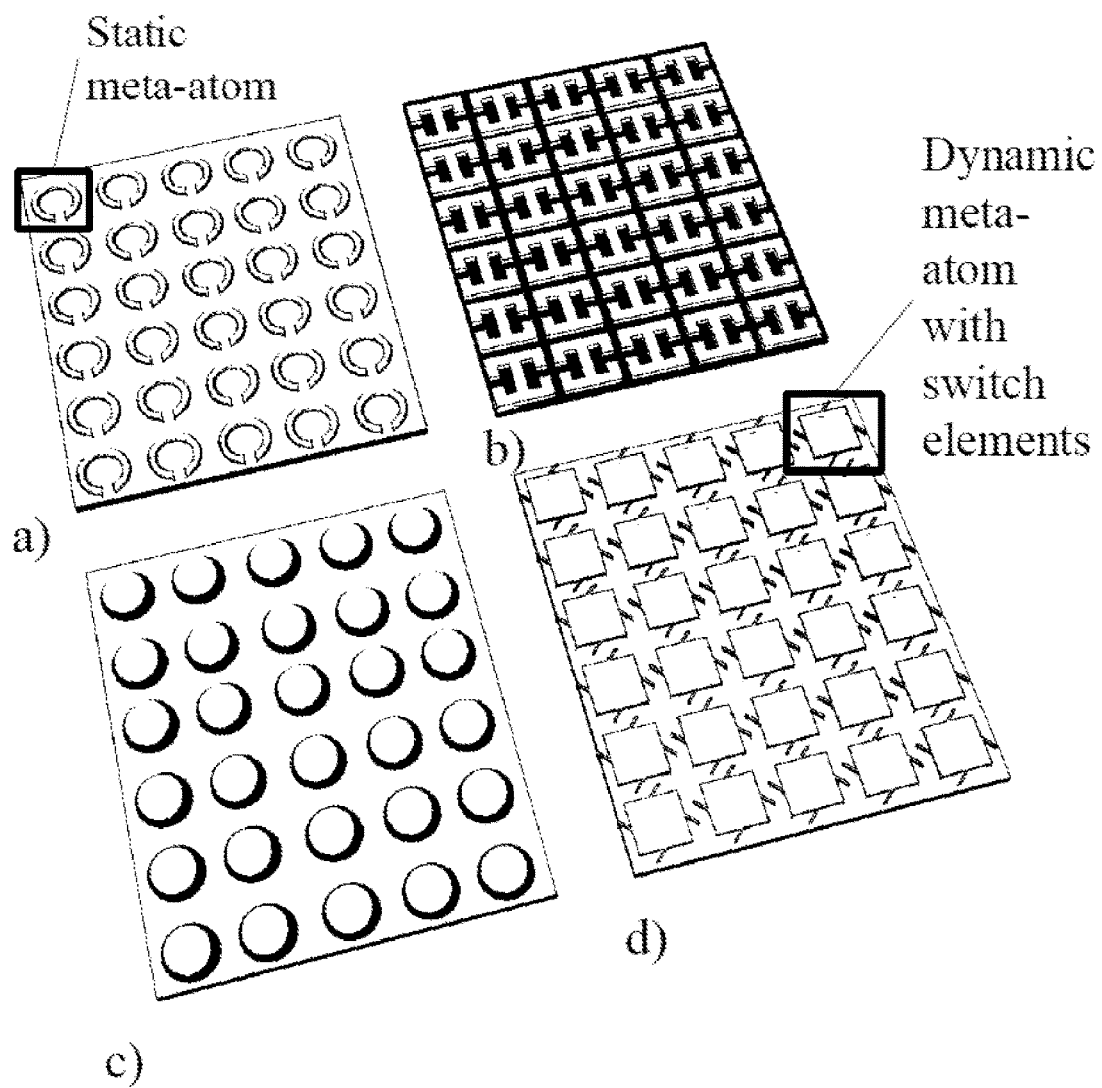
FIG. 2 shows different examples for meta-atom patterns that may be employed as controllable elements according to the present disclosure.

The key-enabler for solving the above mentioned problems across all frequency domains, and for introducing control over the wireless environment is the concept of metamaterials and metasurfaces [5], [6], [7]. Metamaterials are artificial structures, with engineered electromagnetic (EM) properties. In their most common form, they comprise a basic structure, the unit cell, which is repeated periodically within a volume. Metasurfaces are the 2D counterparts of metamaterials, in the sense of having small—but not negligible—depth as shown in FIG. 2. While materials found in the nature derive their properties from their molecular structure, the properties of metamaterials stem from the form of their unit cell design. Thus, when treated macroscopically, metamaterials can exhibit any custom permittivity and permeability values, even beyond those found in natural materials. As a consequence, metamaterials enable exotic interactions with impinging EM waves, being able to fully absorb them, reflect or refract them towards completely desired directions. Finally, the dynamic unit cell designs can be altered with external bias, endowing metamaterials and metasurfaces with adaptivity.

The methodology for introducing software control over the EM behavior of a wireless environment consists of coating objects, such as walls, furniture, overall any objects in the indoor or outdoor environments, with HyperSurfaces, a class of software-controlled metasurfaces [8] described herein. HyperSurfaces merge networked control elements with adaptive metasurfaces. The control elements apply the proper bias to adaptive metasurface unit cells, thereby attaining a desired macroscopic EM behavior. Additionally, the HyperSurface has sensing and interconnectivity capabilities, which allow it to become aware of ongoing communications and enter control loops for optimizing their performance. In this disclosure a HyperSurface tile architecture is introduced. The tile is a rectangular HyperSurface unit that can cascade and coat planar environmental objects. The tiles are interconnected automatically in an ad-hoc networking manner, resulting in a software controlled environment, as shown in FIG. 1. Additionally, the high-level programming interfaces for interacting with tiles for communication purposes are discussed, as well as their manufacturing-time calibration process, mapping metasurface functions to specific meta-atom configurations. It is further proceeded to study the practical applications of HyperSurfaces for wireless communications.

The following part of this disclosure is organized as follows. Section 2 provides the necessary background knowledge on metasurfaces. Section 3 details the HyperSurface tile architecture. Section 4 presents the intended application to wireless communications. Further aspects are discussed in Sections 5 and a conclusion is provided in Section 6.

2. A Concise Overview of Metasurfaces

A metasurface is a composite material layer, designed and optimized to function as a tool to control and transform EM waves [5]. The layer thickness is small and can be considered as negligible with respect to the wavelength in the surrounding space.

Examples of meta-atom patterns constituting the building blocks of some exemplary metamaterials and metasurfaces are shown in FIG. 2. The meta-atoms are usually composed of a conductive material (e.g., copper, silver, or gold) and are placed over a dielectric substrate [5]. Copper and Silicon constituted very early material choices, while many more options, such as graphene, have been studied since. In one particular example, the meta-atoms represent a metallic pattern periodically repeated over a Silicon substrate. The meta-atoms can be static or dynamic. FIG. 2-a illustrates a well-studied metasurface design comprising split-ring resonators as the meta-atom pattern. Dynamic meta-atoms incorporate phase switching components, such as micro-electromechanical switches or CMOS transistors (FIG. 2-d), which in general change the local impedance via an external control signal. In the static case the interaction with impinging EM waves is fixed, while the dynamic case allows for time-variant, controlled response [5].

Dynamic meta-atoms may be fabricated, e.g., as conventional printed circuit boards (PCBs). Another type of fabrication is large area electronics (LAE), e.g., using conductive ink-based printing methods on flexible and transparent polymer films.

Figure 3:
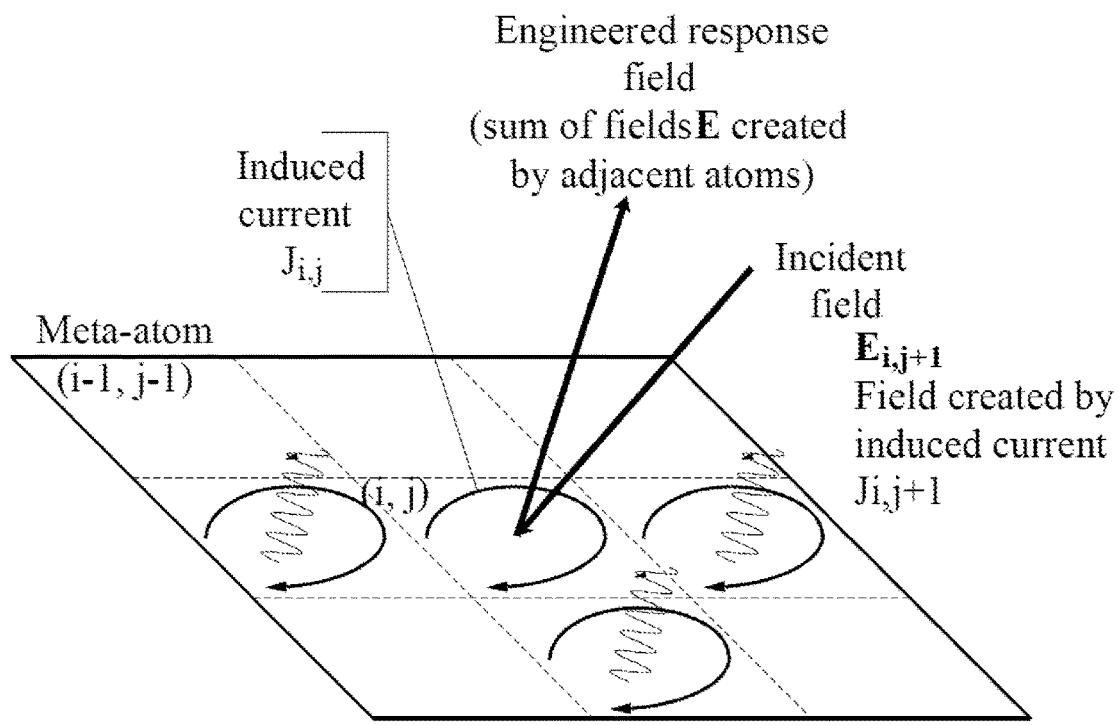
FIG. 3 shows the principle of metasurface functionality, wherein incident waves create a well-defined electromagnetic (EM) response to the unit cells and wherein the response is crafted in such a way that the aggregate field follows a metasurface-wide design objective, e.g., reflection towards a custom angle.

The operating principle of metasurfaces is shown in FIG. 3. Meta-atoms can be assigned array identifiers, i, j, denoting their 2D arrangement. When an EM field illuminates the metasurface, well-defined currents $J_{i,j}$ are created via induction within each meta-atom. The induced currents in turn create secondary EM fields, $E_{i,j}$, affecting neighboring cells as follows. The total EM response field E at any given cell j, is the superposition of all secondary fields created by neighboring cells, e.g., $E_{i\pm1,j\pm1}$. Thus, the metasurface response E is fully defined by the meta-atom pattern, and can therefore be designed to offer an engineered EM end-behavior. The dynamic meta-atoms are engineered to be controllable to yield a custom response field.

From a qualitative aspect, the operation of metasurfaces and metamaterials can be thought of as a carefully designed arrangement of multiple small antenna units. The arrangement can be tuned to resonate to incoming waves of a certain frequency absorbing their energy, or redirect and polarize them using the antenna units in receiving and transmitting loops. In dynamic metasurfaces, the interconnections between the antenna units can be altered, thereby producing a tunable end-behavior. In other words: The meta-atoms can be viewed as either input or output antennas, connected in custom topologies via the switch elements. Impinging waves enter from the input antennas, get routed according to the switch element states, and exit via the output antennas, exemplary achieving customized reflection.

The supported, macroscopic types of interactions between a metasurface and impinging EM waves result in functionalities, denoted as functions and classified as follows [6]:

Wave steering, i.e., reflecting or refracting an impinging wave from a given incident angle towards a direction dependent on the meta-atom configuration. Lens functionality, i.e., the focus of reflected waves towards a given remote point, constitutes a common example of this class.

Wave absorbing, i.e., ensuring minimal reflected and/or refracted power for impinging waves.

Wave polarizing, i.e., changing the oscillation orientation of the wave's electric and magnetic field.

Many additional functions are possible, e.g. wave filtering and collimation, resulting from fascinating metasurface properties such as near zero permittivity and/or permeability response, peculiar anisotropic response leading, e.g., to hyperbolic dispersion relation, giant chirality, non-linear response and more [7]. These traits can be exploited in a variety of applications, as for example in wide-band communications, highly efficient energy harvesting photovoltaics, and thermophotovoltaics, ultra-high resolution medical imaging, sensing, quantum optics and military applications [7].

3. The HyperSurface Tile Architecture

Figure 4A:
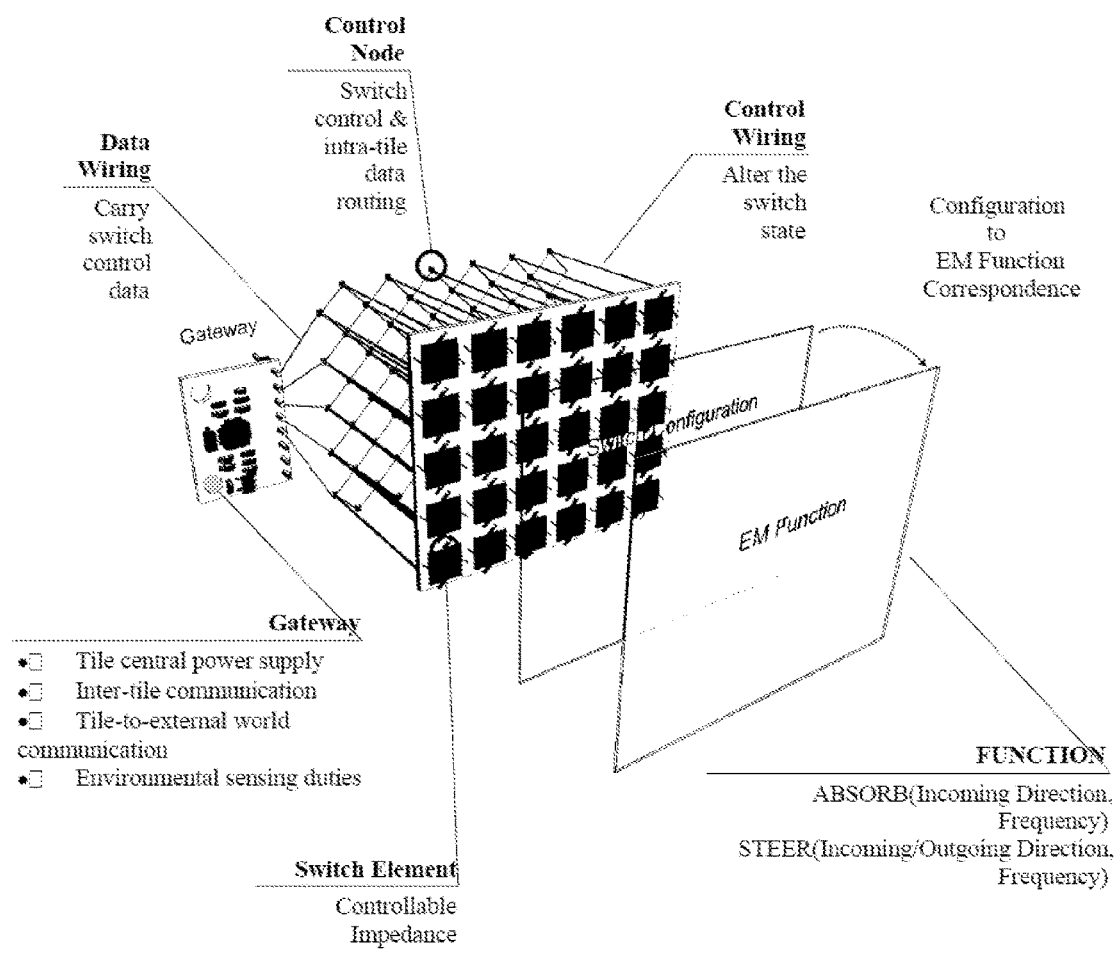
FIG. 4a shows the functional and physical architecture of a single HyperSurface tile, wherein a desired and supported EM function is attained by a switch state configuration setup and wherein the configuration commands are propagated within the tile via the controller intra-network and, further, whereby inter-tile and external communication is handled by standard gateway hardware.
Figure 4B:
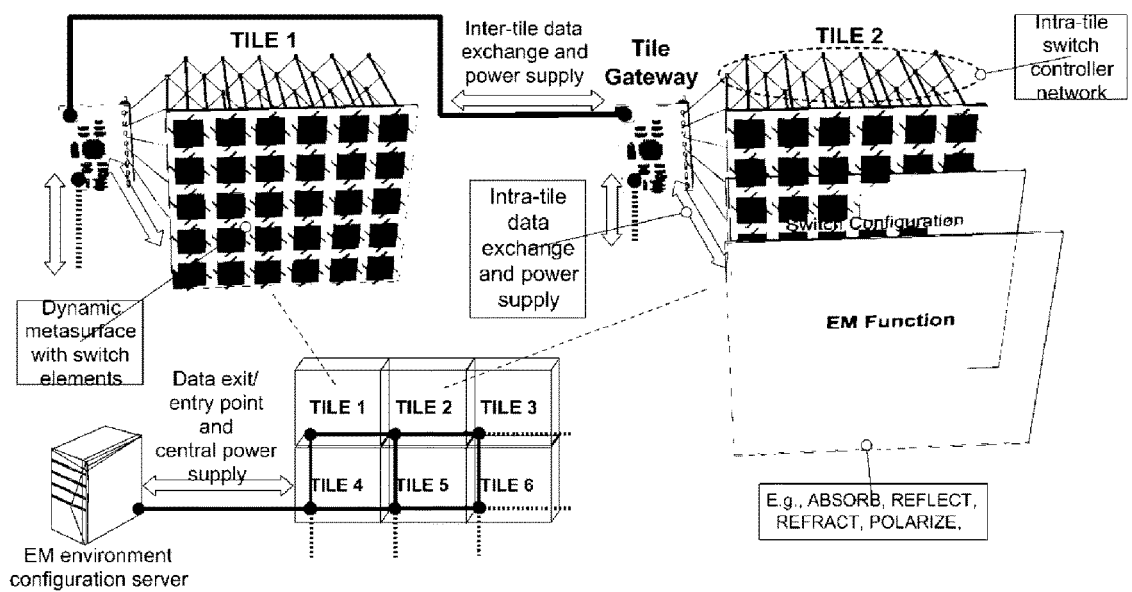
FIG. 4b shows an illustration of a HyperSurface tile architecture and a tile-enabled wireless environment model, wherein as tiles are placed over an environmental object, such as a wall, they "click" together, connecting data and power lines among the tile gateways.

A HyperSurface tile is envisioned as a planar, rectangular structure that can host metasurface functions over its surface, with programmatic control. It comprises a stack of virtual and physical components, shown in FIG. 4a. FIG. 4b shows how a plurality of tiles arranged next to each other can extend to a tiled architecture.

The Functionality & Configuration layers: A HyperSurface tile supports software descriptions of metasurface EM functions, allowing a programmer to customize, deploy or retract them on-demand via a programming interface with appropriate callbacks. These callbacks have the following general form:

outcome←callback(tile_ID, action_type, parameters)

The tile_ID is the unique address of the intended tile gateway in the inter-tile network (e.g., an IPv6).

The action_type is an identifier denoting the intended function to be applied to the impinging waves, such as STEER or ABSORB. Each action type is associated to a set of valid parameters. For instance, STEER commands require: i) an incident wave direction, ii) an intended reflection direction, and iii) the applicable wave frequency band. ABSORB commands require no incident or reflected wave direction parameters. Notice that metasurfaces can act as angle-independent absorbers, i.e., absorbing from any direction [9].

The functionality layer is exposed to programmers via an API that serves as a strong layer of abstraction. It hides the internal complexity of the HyperSurface and offers general purpose access to metasurface functions, without requiring knowledge of the underlying hardware and physics. Thus, the configuration of the phase switch materials that matches the intended EM function is derived automatically, without the programmer's intervention.

The Metasurface Layer: It is the metasurface hardware comprising dynamic meta-atoms (also referred to as controllable elements), whose configuration is altered to fit the intended EM function. In general the metasurface hardware comprises passive and active elements. For instance, the example of FIG. 4a comprises conductive square patches (passive) and CMOS switches (active). Custom configurations are creating by setting the switches to appropriate impedance values. In a simple case, the ON (most conductive) or OFF (most insulating) switch states can be considered. We note that dynamic meta-atom designs have been studied in the literature, offering a wide variety of choices [5].

The meta-atom size and the thickness of the tile are important design factors, which define the maximum frequency for EM wave interaction. As a rule of thumb, meta-atoms are bounded within a square region of $\lambda/10 \leftrightarrow \lambda/5$. $\lambda$ being the EM interaction wavelength. The minimal HyperSurface thickness is also in the region of $\lambda/10 \leftrightarrow \lambda/5$. Thus, for an interaction frequency of 5 GHz, the meta-atom would have a side of ~7.5 mm, with similar minimum HyperSurface thickness. Moreover, a minimum of 10×10 meta-atoms are usually required to exhibit an EM functionality such as STEER or ABSORB.

The Intra-tile Control Layer: It is the electronic hardware component that enables the programmatic control over the HyperSurface. It comprises a network of controllers, each with responsibility over one active meta-atom element. The control over a switching element is achieved via the control wiring (in red, FIG. 4a). Additionally, the controllers are able to exchange information, in order to propagate switch configuration information within the tile. For example, a grid topology using separate wiring (in blue, FIG. 4a) can be employed for the control tasks. The networked controller approach minimizes the required control wiring, which benefits the manufacturing cost and the cross-talk minimization with the intended EM functionality.

The control wiring can be used for powering the control nodes and the active metasurface elements. For instance, in the case of CMOS elements, which require a constant power supply, the control wiring can carry a constant voltage level while the exchanged information is encoded as fluctuations over this level. Other power supply options are freely allowed, according to each specific tile design. Separate power lines can be deployed in the most power-hungry cases, while extremely-low power designs may enable autonomous tiles that rely on energy harvesting. Furthermore, a fully wireless design for the interconnection of the controllers can be envisioned, employing energy harvesting.

The Tile Gateway Layer: It specifies the hardware (Gateway, also referred to as "adjusting unit") and protocols that enable the bidirectional communication between the controller network and the external world (such as the Internet), as well as the communication between tiles. In particular, each tile may incorporate a lightweight Internet-of-Things (IoT) gateway which enables it to receive commands from a central configuration service and set its custom EM behavior accordingly. This provides flexibility in the HyperSurface operation workflow, as follows. In general, multiple tiles are expected to be used as coating of large areas, as detailed later in Section 4. Moreover, the tile hardware is intended to be inexpensive, favoring massive deployments. The networked tile architecture allows for offloading demanding tasks to powerful, external servers. A basic external service is to deduce and return the optimal tile configurations to be deployed after taking into consideration the status of other HyperSurfaces and their environment. Based on these specifications, existing Internet-of-Things (IoT) platforms can constitute exemplary choices for tile gateways [10]. The sensing capabilities of existing IoT platforms enable the monitoring of the tile environment, such as the impinging wave power, enabling the adaptive tuning of the tile functions.

Miniaturized, powerful and inexpensive inter-tile controllers may be fabricated in mass production. These controllers may be able to directly support advanced communication protocols. Therefore, they may be able to communicate with the external world directly, without requiring a gateway to act as a mediator. Depending on their capabilities, advanced controllers may also act as ambient intelligence, handling the decisions for the HyperSurface configuration in an autonomous fashion, without the need for an external calculation service.

The described interconnectivity approach can also be employed during the tile design phase, for the automatic definition of the supported EM functions and their input parameter range. Since deriving the tile behavior via analysis is challenging in all but static meta-atom cases, an approach based on a control algorithm or a learning heuristic can also be employed instead. According to it, an intended EM function is treated as an objective function and, subsequently, the tile is checked for compliance via illumination by an external wave (input) and reflection/absorption measurements (output). A control algorithm or learning heuristic is then employed to detect iteratively the best switch configuration that optimizes the output of the objective function. Once detected, the best configuration is stored in a lookup table for any future use. It is noted that metasurfaces are generally not know to exhibit an inherent limitation regarding the EM functions that they can support.

4. Applications to Wireless Communications

Two major factors are important in the design of a wireless communication system, namely, the path loss and multi-path fading.

The path loss and multi-path fading factors are defined by the environment where the communication system operates. In an indoors environment, for instance, the geometry and composition of walls and objects define the path loss and the multiple propagation paths connecting a transmitter to a receiver. Presently, in the prior art, such environmental effects cannot be controlled, and their probabilistic nature has negative effects on the performance of communication systems [1].

Figure 5:
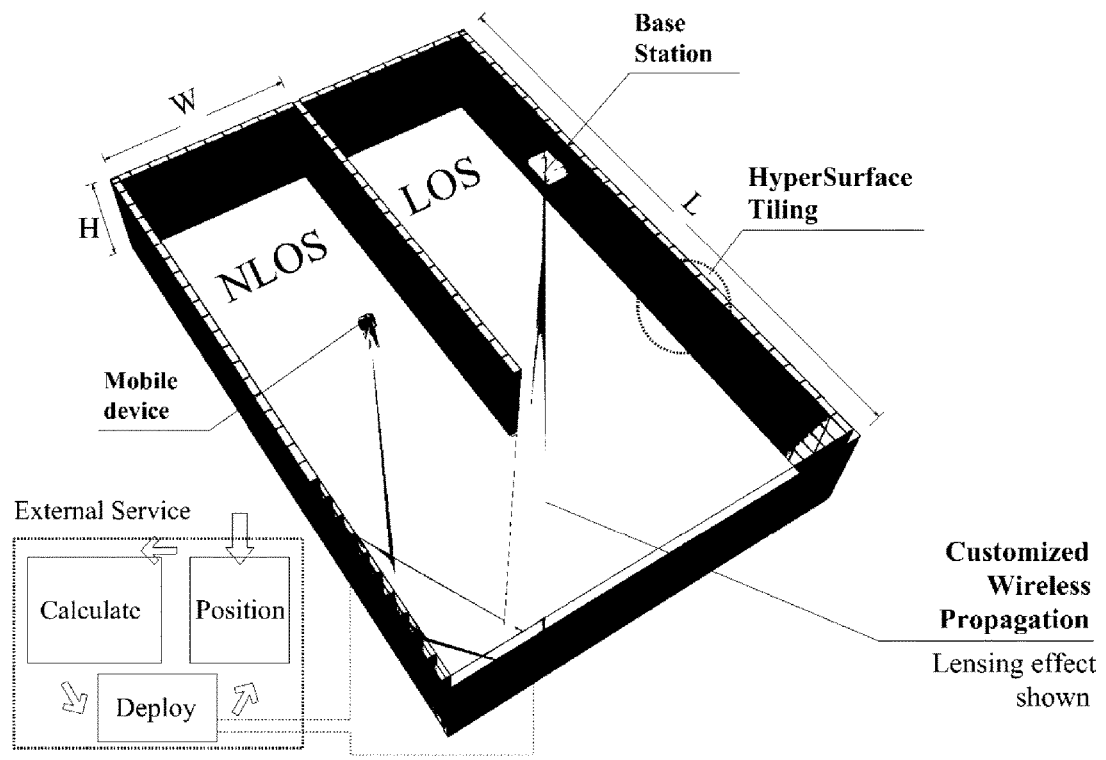
FIG. 5 shows a HyperSurface tile-coated environment which can exhibit user-adapting, unnatural wireless behavior, and is shows countering free space path loss by acting as a lens for impinging waves.
Figure 6:
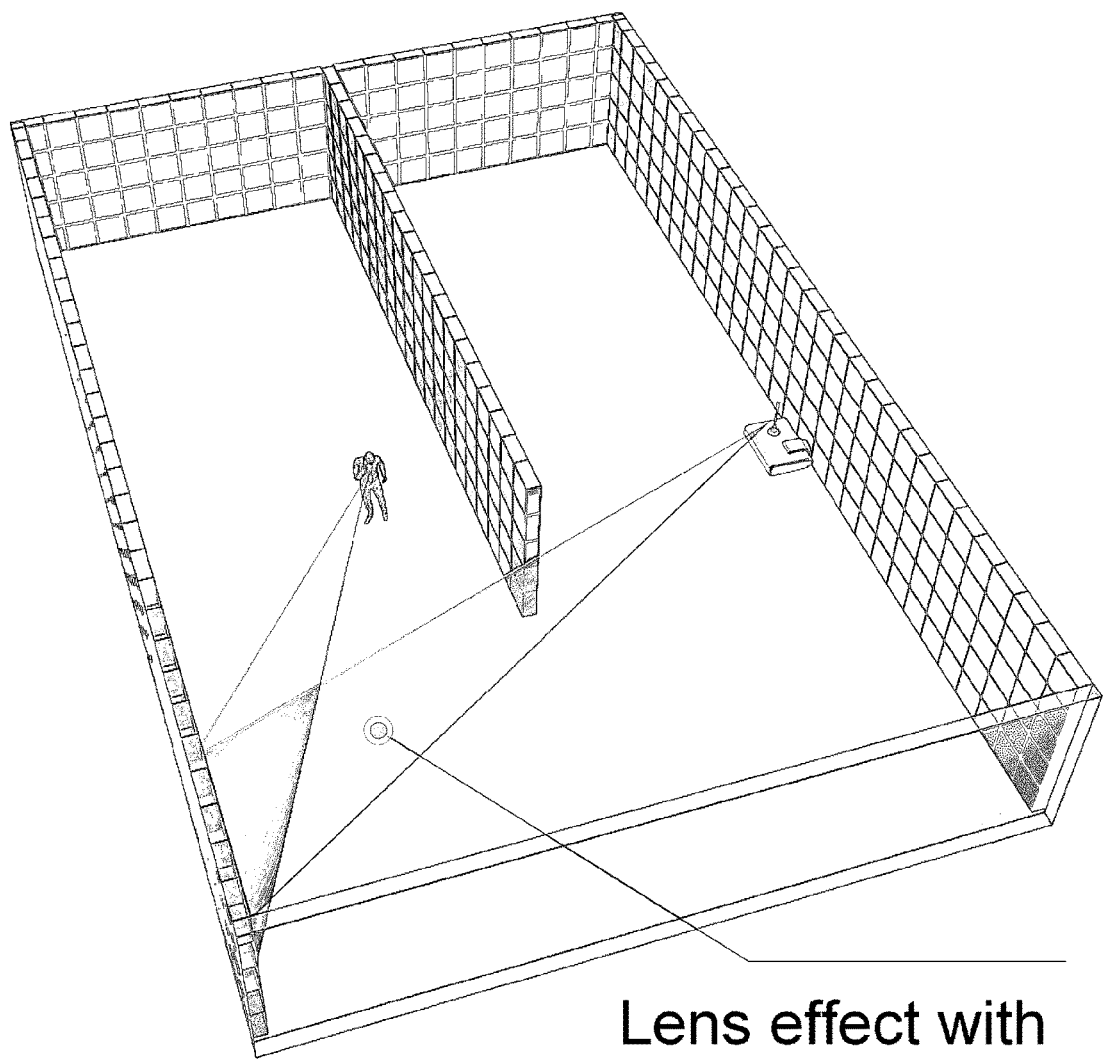
FIG. 6 shows a wireless propagation example using HyperSurfaces, illustrating the potential for unnatural reflection, beyond Snell's law.

HyperSurfaces can be employed to provide a deterministic environmental behavior, optimizing the performance of communication systems. FIG. 5 illustrates an example of a wireless transmitter/receiver pair operating in an indoor environment. The depicted space comprises a Non-Line-of-Sight (NLOS) and a direct Line-of-Sight (LOS) area. In the natural case, the NLOS area would suffer from low signal power, resulting into lower coverage and data rates. Moreover, the absence of a direct dominant path would magnify multi-path fading phenomena, given that the NLOS area would be served via multiple, considerably attenuated, uneven paths. The same environment can exhibit a much different behavior, assuming HyperSurface-tiled walls. With appropriate reflection functions applied at each tile, a focusing lens behavior can be attained. Thus, the power reaching the receiving device can be considerably higher than the default behavior, while the propagation paths become more uniform and well-defined. We note that HyperSurfaces allow for completely custom wave steering, beyond well-known physical laws, a property inherited by their metasurface aspect. An example is given in FIG. 6, illustrating reflection at a negative angle, seemingly overriding Snell's law. Therefore, combined with a lens effect, wave power losses can also be minimized in terms of total number of reflections towards the target device.

FIG. 5 illustrates the complete control loop that can be employed to achieve the described lens effect, in a mobile device-to-base station communication scenario. For ease of exposition, we consider a single communicating pair, noting that the case of multiple communicating pairs can also be considered, taking into account cross-interference. The wave attributes impinging on the HyperSurface coating, such as phase or power, are measured by the corresponding tile sensors and are forwarded by the inter-tile network to an external service. The sensed data facilitate the deduction of the EM wave direction impinging on each tile and, consequently, the deployment of proper EM functions in return. The service can also enrich the sensed data with the input from other, external sensors within the space, to increase the data accuracy. Such external data can exemplary include the estimated device position, its mobility pattern and device type identification and its nominal wireless module characteristics, such as antenna radiation pattern.

The combination of internal and external data can yield the estimated incident direction upon each tile, relative to the tile orientation in space. Knowing the location of the base station, the external service can then calculate the optimal HyperSurface function deployment per each tile that will create the lens effect. The corresponding actuation commands, exemplary shown in FIG. 5, are subsequently sent to the HyperSurface via the inter-tile network. Notice that the described cycle of operation is continuous, constantly adapting to the set objective and the time-variant position and needs of the users. Real-time adaptation of the tiles in highly dynamic, mobile scenarios are possible.

5. Further Aspects

Regarding the tile architecture, the optimization of the dynamic meta-atom design constitutes a notable goal towards maximizing the supported function range of a tile. Meta-atom designs may be able to interact with a wide variety of frequencies, e.g., from 1 to 60 GHz or even THz. Tile sounding procedures may be defined, i.e., simulation-based and experimental processes for measuring the supported functions and parameters per tile design. Additionally, the electronic and networking design of the switch controllers may be optimized to yield fast tile reconfiguration, minimal energy consumption and manufacturing cost. At the gateway, energy-harvesting solutions may be provided to enable self-sustaining HyperSurface tiles. Inter-tile networking protocols may be designed to offer fast, energy-efficient wireless environment reconfiguration, supporting a wide range of user mobility patterns. Adaptation to user mobility can also target the mitigation of Doppler shift effects.

The HyperSurface control software may be optimized regarding its complexity, modularity and interfacing capabilities. Low-complexity, fast configuration optimizers can increase the environments maximum adaptation speed. Towards this end, both analysis-based on analytical as well as heuristic optimization processes may be provided. Additionally, following the Network Function Virtualization paradigm [11], the various described and evaluated optimization objectives can be expressed in a modular form, allowing their reuse and combination. For example, the tiles may be configured to maximize the minimum received power within a room, subject to delay spread restrictions. Well-defined tile software interfaces can allow for a close collaboration with user devices and external systems. For instance the power delay profile towards a user can be matched to the Multiple-Input Multiple Output arrangement of his device [12]. It is noted that such joint optimization can be aligned to the envisioned 5G objectives of ultra-low latency, high bandwidth, and support for massive numbers of devices within an environment [13].

The abstractions imposed by the HyperSurface programming interface is in agreement with the control/data plane decoupling effort in SDN/NFV/Cloudification paradigms. This provides a natural way of making the HyperSurface interface software compatible to existing Software-Defined Networking (SDN) standards. SDN advocates for the decoupling of network control from the underlying hardware, and performs all network optimization tasks in software, at a central point with network-wide visibility (SDN controller). The network control presently refers to wired/wireless network hardware, such as routers, switches and base stations. Moreover, the network optimization tasks aligned with NFV, such as load balancing, spectrum sharing, power allocations, resource allocations, access control and routing are modeled as modular software applications, which can be centrally ran and combined as needed. In a similar manner, the described HyperSurface functionalities can also be modeled as software applications at SDN controllers, providing the complementary softwarization/cloudification of the wireless environments as well.

The described and evaluated wireless applications can be generalized in the form of free "air" routing, for multiple communicating devices, with objectives such as interference minimization, adaptive wireless coverage and even physical-layer security, disabling eavesdropping potential. The "air" paths can be adapted to node mobility patterns, following their predicted locations in real time. The control over multi-path fading effects can also be generalized in the form of power delay profile shaping. For instance, NLOS areas naturally subject to Rayleigh fading [14], can be tuned to experience a type of virtual LOS performance. Additionally, optimal 3D area tiling when full coating is not feasible constitutes an additional research direction.

It is noted that the HyperSurface concept is applicable to any frequency spectrum and wireless architecture. Therefore, the corresponding path loss, fading, interference and NLOS problems may be solved in general using HyperSurfaces. Such directions can further focus on indoors and outdoors communication environments. In indoors settings, the HyperSurface tiles can cover large parts of the wireless environment, such as walls, ceilings, furniture and other objects and offer more precise control over electromagnetic waves. In outdoors settings, the HyperSurface tiles can be placed on key-points, such as building facades, highway polls, advertising panels, can be utilized to boost the communication efficiency. In both settings, i.e., in indoors and outdoors, the automatic tile location and orientation discovery can promote the ease of deployment towards "plug-and-play" levels. Moreover, the joint optimization of antenna beam-formings and tile configurations may be used, to achieve the maximum performance.

The use of HyperSurfaces in mm-wave systems, IoT, 5G systems and THz communications is of particular interest. For example, mm-wave and THz systems are severely limited in terms of very short distances and LOS scenarios. The HyperSurfaces can mitigate the acute path loss by enforcing the lens effect and any custom reflection angle per tile, avoiding the ambient dispersal of energy and NLOS effects, extending the effective communication range. The dynamic meta-atoms able to interact with THz modulated waves need to be designed. This has been shown to be possible for graphene-based metasurfaces [15]. The tile sensing accuracy and re-configuration speed may match the spatial sensitivity of THz communications. Optical tile internetworking is another approach to ensure that the tile adaptation service is fast enough for the THz communication needs.

Finally, the control of EM waves via HyperSurfaces can find applications beyond classic communications. EM interference constitutes a common problem in highly sensitive hardware, such as medical imaging and radar technology. In these cases, the internals of, e.g., a medical device can be treated as an EM environment, with the objective of canceling the interference to the imaging component caused by unwanted internal EM scattering. Such interference can be mitigated only up to a degree during the design of the equipment. Common discrepancies that occur during manufacturing can give rise to unpredictable interference, resulting into reduced equipment performance. However, assuming HyperSurface-coated device internals, interference can be mitigated, or even negated, after the device manufacturing, via simple software commands.

6. Conclusion

The present disclosure introduces software control over the electromagnetic behavior of a wireless environment. The methodology consisted of coating size-able objects, such as walls, with HyperSurface tiles, a novel class of planar materials which can interact with impinging waves in a programmable manner. Interaction examples include wave absorbing and steering towards custom directions. The tiles are networked and controlled by an external service, which defines and deploys a configuration that benefits the end-users. Notable applications are the mitigation of propagation loss and multi-path fading effects in virtually any wireless communication system, including mm-wave and THz setups.

In addition to the above disclosure, the technique described herein and embodiments of the technique described herein may be further described as follows. In particular, embodiments of the technique according to the present disclosure may exhibit or comprise one or more of the below features. Further, the features of the embodiments of the technique described herein may become more clear on the basis of the following disclosure.

The efficiency of wireless communications is dictated by the effects of the environment, including the set of objects whose geometry, position and composition define the propagation paths of electromagnetic waves, and the severity of effects such as multi-path fading and path loss. Accounting for these effects is an intractable problem in almost all but the simplest cases, as the environment affects communication in a probabilistic manner which limits the communication performance. The present disclosure introduces a novel paradigm, which "softwarizes" the wireless behavior of an environment. Particularly, the wireless propagation is constituted deterministic, via programmatic commands, and optimizable even in unnatural ways, such as exhibiting time-variant—and even negative—reflection angles. This potential is enabled by the HyperSurfaces, a class of planar objects proposed by the present disclosure, whose electromagnetic behavior is software-defined. The technological factors that enable this behavior are discussed, and the HyperSurface architecture is detailed. It is shown that HyperSurfaces allow for a joint optimization of communications at the device end-points and across their environment, allowing for novel, breakthrough capabilities in wireless communications. These exemplary include mitigating or completely negating path loss and fading, wave steering to negate interference and eavesdropping, and more. A macroscopic HyperSurface model is defined, enabling further exploration of these capabilities. Finally, novel research areas that stem from the proposed paradigm are identified, along with fitting research methodologies.

I. Introduction

Wireless communications are rapidly advancing, nearing the theoretical upper bounds in their efficiency. Advances in antenna designs, encoding and modulation schemes, battery technology and energy-efficient data processing have been instrumental to this progress. Wireless systems now operate near their optimal data transfer rates, with a nearly full spectrum utilization. However, the novelty stops at the device boundaries: the environment affects communications in a probabilistic manner, and smart device hardware adapts to its fluctuations as good as possible [1a]. The references indicated in square brackets are listed in the "References" section below. Each of the cited references is incorporated herein in its entirety. More precisely, the references are incorporated in their entirety in the context of the part of the description, where the citation occurs.

The present disclosure founds a novel communication paradigm that allows devices to converse with the environment and change its behavior according to their needs, via software, allowing for unprecedented capabilities [2a].

Existing wireless environments comprise objects with assorted geometry, position and material composition, which are: i) unaware of the ongoing communications, and ii) have a static interaction with electromagnetic waves. A signal emitted by a sending device (in the following also: "transmitter") undergoes path loss due to diffusion, multiple reflections, refractions and diffractions, finally reaching a receiver via multiple paths, each with its own attenuation and delay. This probabilistic behavior leads to a plethora of well-studied phenomena, such as delay spread and multipath fading, i.e., sharp fluctuations in the received signal, drastically undermining the communication efficiency [3a]. Mobility and time-variant environmental geometry also affect the perceived signal frequency, a phenomenon known as Doppler spread, which constitutes another factor affecting communication quality within a given environment [4a].

The present disclosure proposes a novel, softwarized wireless environment, which: i) is aware of the ongoing communications within it, and ii) can alter its interaction with the electromagnetic waves via a programming interface, to benefit the communication efficiency. Thus, the wireless environment can actively participate in the communication process, being programmable and optimizable. The methodology relies on metasurfaces, i.e., planar, artificial structures, which have recently enabled the realization of novel electromagnetic components with engineered and even "unnatural" physical functionalities [5a]. The present disclosure proposes the first application of metasurfaces to wireless environment optimization. Specifically, a novel hardware platform—the HyperSurface—is proposed, that can host metasurface functionalities described in software, such as parametric wave steering, absorbing and polarizing [2a]. The HyperSurface is a merge of properly-designed metasurfaces with a miniaturized network of controllers, resulting in a structurally reconfigurable (globally, locally, upon request or adaptively) metasurface, whose properties can be changed via a software interface. The controllers receive programmatic directives and perform simple alterations in the metasurface structure, adjusting its overall electromagnetic behavior accordingly. Environment objects coated with HyperSurfaces can therefore exhibit custom, programmable electromagnetic scattering behavior, making the wireless environment controllable. Communication system designers and operators are thus enabled to jointly optimize the complete data delivery process, including the environment, apart from the device behavior.

The present disclosure defines the HyperSurface architecture, detailing the corresponding hardware and software components, organized in well-defined functionality layers. Moreover, the application scope of HyperSurface in the softwarization of wireless communications is made explicit. The unique capabilities offered by the novel concept are discussed, (such as path loss and fading cancellation, perfect spatial multiplexity of wireless channels and eavesdropping cancellation), along with their benefits in communication efficiency, spectrum usage and device battery lifetime. The realizability of HyperSurfaces is supported based on accessible manufacturing technologies, and novel research directions and fitting methodologies are highlighted. A macroscopic model is defined, to facilitate further studies in this novel, inter-disciplinary field. Finally, while the proposed paradigm refers to the interaction of mobile devices, such as smartphones, access points and base stations with their environment, it is noted that the same approach can be employed in additional metasurface application scenarios. Indicative examples include noise cancellation in imaging applications, wireless energy transfer, solar energy-harvesting and heat abduction optimization [6a].

The remainder of this disclosure is organized as follows. Section II provides the necessary background knowledge on metasurfaces. Section III details the HyperSurface architecture. Section IV presents the intended application to wireless communications. A macroscopic HyperSurface model is supplied in Section V. Realizability is detailed in Section VI, and the paper is concluded in Section VII.

II. Prerequisites: Metasurface Basics

The term metasurfaces is used to describe thin (i.e., practically 2D) layers of electromagnetic metamaterials. Metamaterials in general are the outcome of a research direction in Physics that seeks to construct 3D objects with engineered electromagnetic behavior [7a]. In their most classic form, metamaterials and metasurfaces are composed of a building block (meta-atom) that is periodically repeated over a given volume or area respectively. When this periodic structure is treated at a macroscopic level, it can exhibit custom and even exotic electromagnetic properties (e.g. negative permeability and permittivity values). This in turn translates to custom- and even unusual-interaction with impinging electro-magnetic waves. For instance, a metamaterial can exhibit an unnatural, negative refractive index, causing impinging waves to bend at a negative angle of refraction. The range of metasurface-supported electromagnetic properties is not subject to an explicit physical bound. To understand their potential, it is mentioned that a carefully designed stack of metasurfaces, each with its own refraction angle, was able to render an object invisible to electromagnetic waves (cloaking) by gradually bending them around it [8a].

Figure 7:
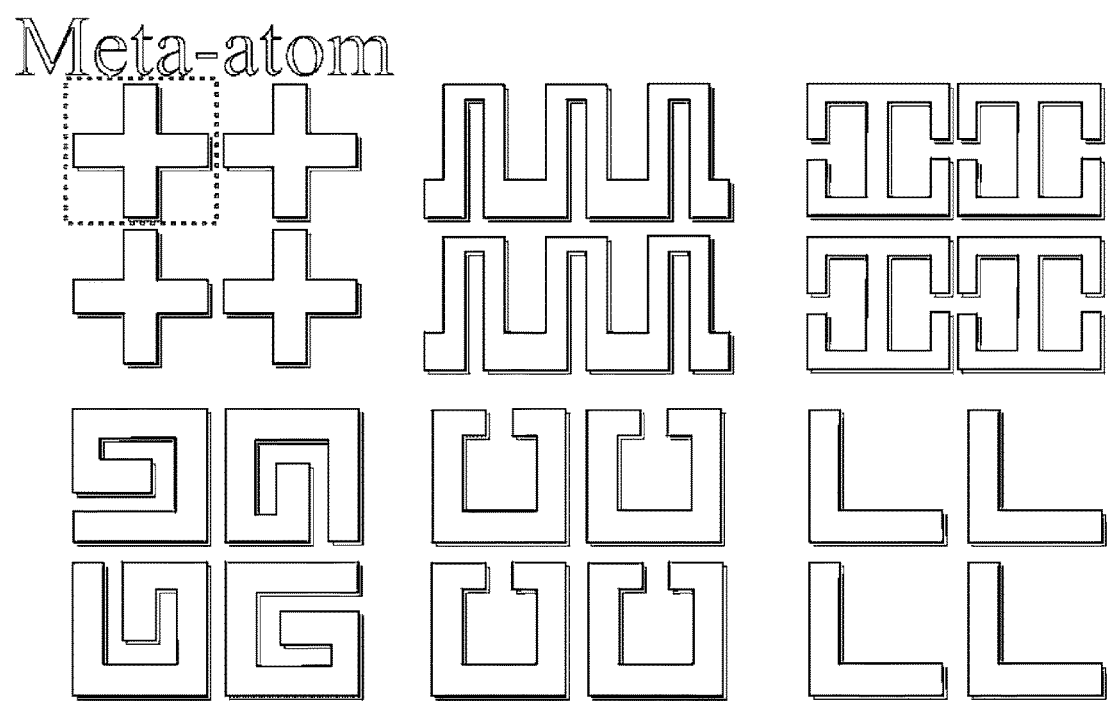
FIG. 7 shows exemplary meta-atom patterns that have been commonly employed and investigated in metasurface research.

Some common meta-atom patterns constituting the building blocks of some of the most common metamaterials and metasurfaces are shown in FIG. 7. The meta-atoms are usually composed of a conductive material and are placed over a dielectric substrate. Copper and Silicon constituted very early material choices, while many more options, such as graphene, have been studied since [9a].

The supported, macroscopic types of interactions between a metasurface and impinging electromagnetic waves result to functionalities, denoted as functions, can be classified as follows [10a]:
  Wave steering, i.e., reflecting or refracting an impinging wave from a given incident angle towards a direction dependent on the meta-atom configuration. Lens functionality, i.e., the focus of reflected waves towards a given remote point, constitutes a common example of this class.
  Wave absorbing, i.e., ensuring minimal reflected and/or refracted power for impinging waves.
  Wave polarizing, i.e., changing the oscillation orientation of the wave's electric and magnetic field.

Many additional functions are possible, e.g. wave filtering and, collimation, resulting from fascinating metasurface properties such as near zero permittivity and/or permeability response, peculiar anisotropic response leading, e.g., to hyperbolic dispersion relation, giant chirality, non-linear response etc. [11a]. These traits can be exploited in a variety of applications, as for example in wide-band communications, highly efficient energy harvesting photovoltaics, and thermophotovoltaics, ultra-high resolution medical imaging, sensing, quantum optics and military applications [12a].

III. The Hypersurface Architecture

HyperSurfaces are the programmable counterparts of meta-surfaces. A HyperSurface is a planar structure that can host multiple functions over its surface upon demand, with programmatic control. It comprises a stack of virtual and physical components, shown in FIG. 8, which are detailed as follows:

HyperSurface API: HyperSurfaces support software descriptions of metasurface functions, allowing a programmer to customize, deploy or retract them on-demand at specified function areas via a programming interface with appropriate callbacks. These callbacks have the following general form:
  outcome←callback(action_type, parameters)

Figure 9:
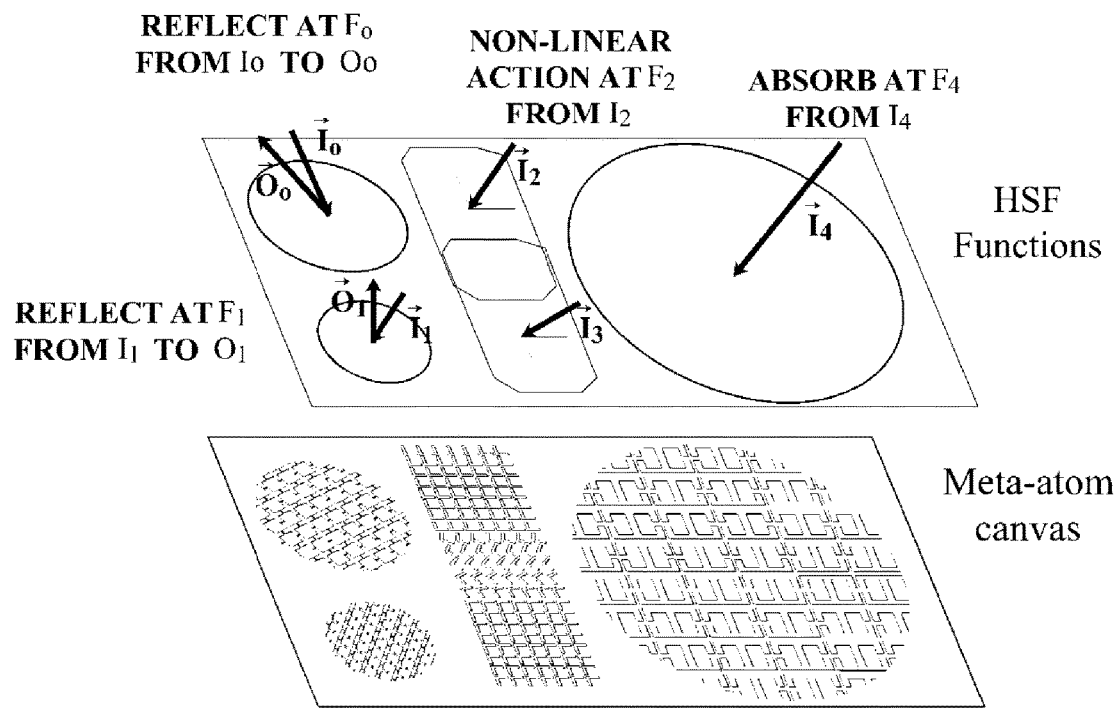
FIG. 9 shows metasurface functions applied locally over the HyperSurface and conceptual mapping to meta-atom patterns according to the present disclosure.

The action_type is an identifier denoting the intended function, such as STEER or ABSORB. Each action type is associated to a set of valid parameters. For instance, STEER commands require: i) an incident wave direction, I (e.g., in vector form), ii) an intended reflection direction, O, iii) the applicable wave frequency, F, and iv) the function area bounds. ABSORB commands require no O parameter. A conceptual deployment is given in the top part of FIG. 9, illustrating various incident wave steering and absorption functions customized and deployed at different parts of the HyperSurface.

An important point is that the HyperSurface API serves as a strong layer of abstraction, hiding the internal complexity of the HyperSurface. It offers user-friendly and general purpose access to metasurface functions, without requiring knowledge of the underlying hardware and Physics.

Function Compiler: It is a middleware that translates the intended functions to the corresponding meta-atom deployment at each point of the HyperSurface, as conceptually shown at the bottom part of FIG. 9. It is noted that the actual meta-atom arrangement may not be periodic or well-formed. However, this assumption is employed for presentation purposes.

Figure 10:
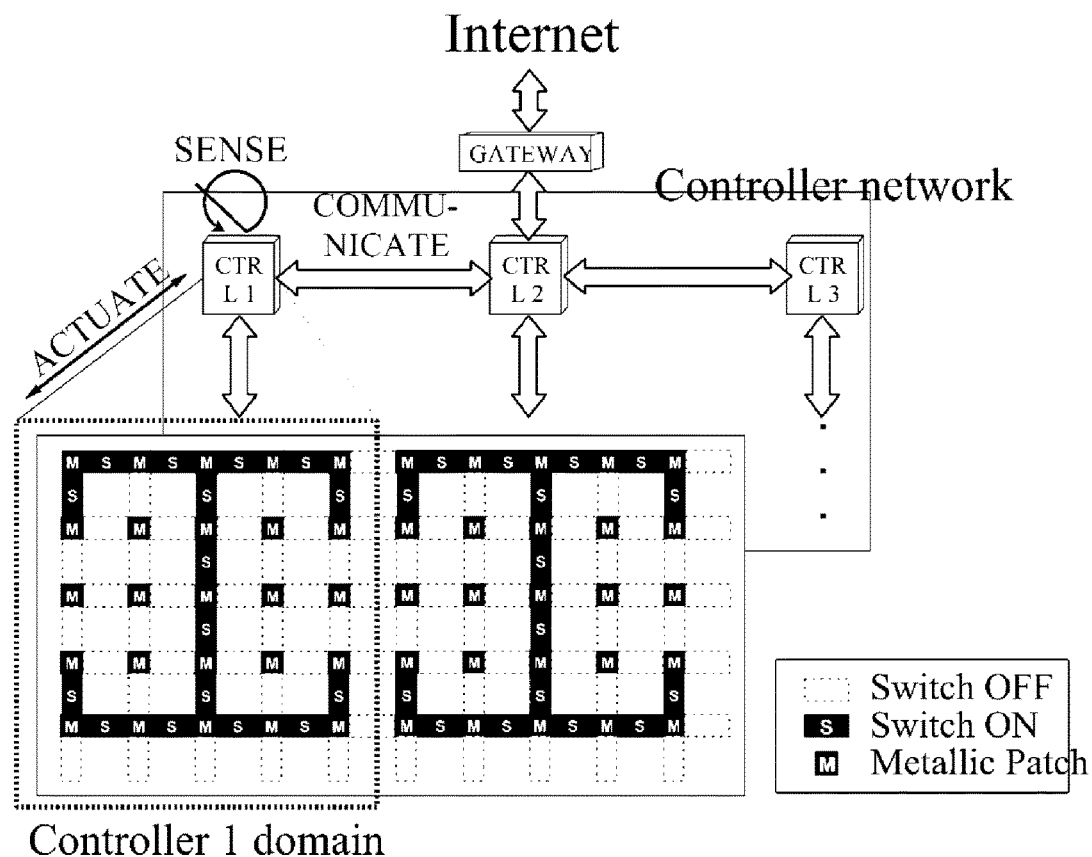
FIG. 10 shows the HyperSurface meta-atom canvas and control layer, wherein a controller regulates the form of the meta-atom canvas within a spatially-limited domain and wherein the controllers are networked and are able to exchange data among themselves and the external world via one or more gateways.

Meta-atom Canvas: It is a hardware layer that can change its internal structure to best fit an intended meta-atom deployment. In general, it comprises passive and active elements. The formation of programmatic meta-atom arrangements is achieved by tuning the state of the active elements accordingly. A simple example is shown in the foreground of FIG. 10, comprising metallic patches and CMOS switches. Custom meta-atoms are stitched together by setting the switches appropriately to ON (conductive) or OFF (insulating) states, to form patterns from FIG. 7. We note that meta-atom canvases have been extensively studied in the literature (referred to as active, functional or digital metasurfaces), offering multiple alternative implementations that have been evaluated via real prototypes. A survey can be found in the study of Zhu et al [9a].

Distributed Sensing and Control Layer: It is the component that enables the adaptive, programmatic control over the HyperSurface. It comprises a network of electronic controllers, each with responsibility over active meta-atom elements within a control domain, as shown in FIG. 10. A controller can monitor and alter the state of active elements, as well as perform sensor duties within its domain. The latter may include measuring the phase and power of an impinging wave, in order to deduce its incident direction.

Intra-communications Layer: It comprises the physical channel specifications and protocols that allow controllers to exchange data with each other, within the HyperSurface. Depending on the application needs, it can dictate wireless or wired physical channels, and point-to-point, multicast or broadcast-based communication protocols.

Interfacing layer: It specifies the hardware (Gateway) and protocols that enable the bidirectional communication between the controller network and the Internet. This provides flexibility in the HyperSurface operation workflow. For instance, controller sense data may be directed to a powerful, external server, which may deduce and return the optimal metasurface functions to be deployed after taking into consideration the status of other HyperSurfaces and their environment in general.

It is noted that the described architecture can be modified to meet the targeted application needs and manufacturing cost constraints. For instance, the controller network may not have sensor capabilities and rely exclusively on external sensing services. Likewise, parameters such as the size of the controller domain, the controllers' layout, their computational capabilities and power supply scheme can be freely adapted to the intended environment.

Finally, it is noted that HyperSurfaces are the successor to the Software-Defined Metamaterial (SDM) concept [7a]. SDMs introduced the concept of 3D objects supporting programmable interaction with electromagnetic waves in general. SDMs focused on a specific way of constituting metamaterials programmable, namely via the incorporation of nano-machines in their structure. Specific architectures, software functions or application-specific considerations were not discussed. HyperSurfaces focus on metasurfaces instead, and in the following sections a specific application scope in wireless communications, operational model, offered functionalities, software API form, implementability and possible future extensions are provided.

IV. Hypersurfaces Applied to Wireless Communications

Two major factors are important in the design of a wireless communication system, namely, the path loss and multi-path fading.

The path loss refers to propagation losses due to the natural expansion of the radio wave front in free space (which is usually modeled as an ever-increasing sphere), absorption losses (sometimes called penetration losses), when the signal passes through media not transparent to electromagnetic waves, diffraction losses when part of the wave front is obstructed by an opaque obstacle, and losses caused by other phenomena.

Multipath refers to the phenomenon where the signal radiated by a transmitter may travel along many and different paths to a receiver simultaneously, Multipath waves are combined at the receiver antenna, resulting in a received signal that may vary widely, depending on the distribution of the intensity and relative propagation time of the waves and bandwidth of the transmitted signal. The total power of interfering waves in a Rayleigh fading scenario varies quickly as a function of space. Small-scale fading refers to the rapid changes in radio signal amplitude in a short period of time or travel distance.

The path loss and multipath fading factors are defined by the environment within which the communication system operates. In an indoor environment, for instance, the geometry and composition of walls and objects define the path loss and the multiple propagation paths connecting a transmitter to a receiver. Presently, such environmental effects cannot be controlled, and their probabilistic nature has negative effects on the performance of communication systems [1a].

Figure 11:
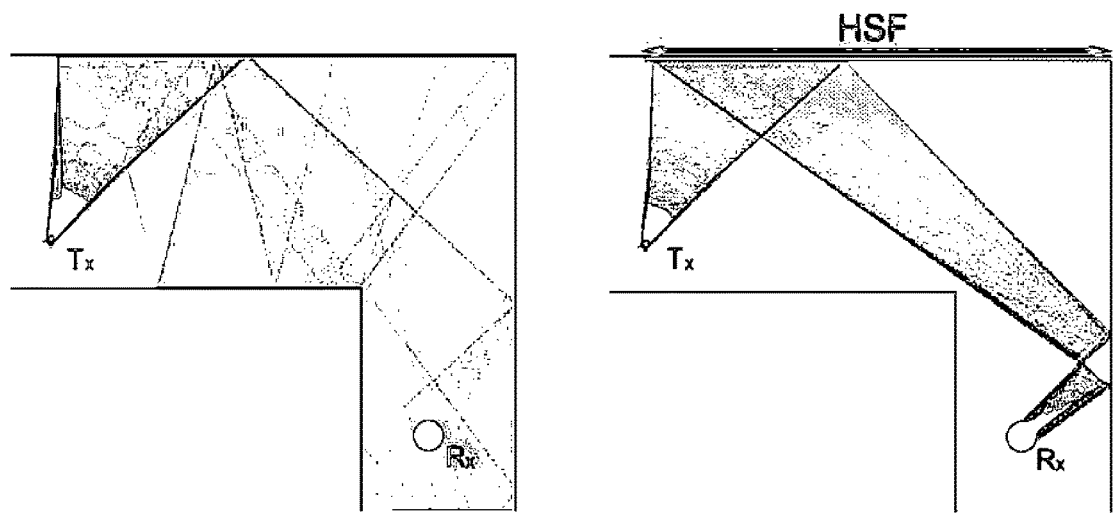
FIG. 11 shows exemplary that HyperSurfaces can counter free space path loss by acting as a lens for impinging waves, wherein the HyperSurface is modeled as a set of directive minireflectors and wherein darker colors denote higher signal power levels.

As previously stated, HyperSurfaces can be employed to provide a softwarized environmental behavior, optimizing the performance of communication systems. In FIG. 11 an example of a wireless transmitter/receiver pair operating in an indoor environment is depicted, with and without HyperSurface assistance. The walls are treated as perfect reflectors, and a ray-tracing engine deduces the portion of the transmitted power reaching each point in the studied space. The left inset depicts the classic case: the transmitter energy is diffused randomly within the space, and only a small portion of it reaches the receiver, via multiple uneven paths. The right inset considers a HyperSurface-coated wall. With appropriate reflection functions applied at each point of the HyperSurface, a focusing lens behavior is affected. The power reaching the receiving device is considerably higher than the default behavior, while the propagation paths are more uniform and well-defined.

Figure 12:
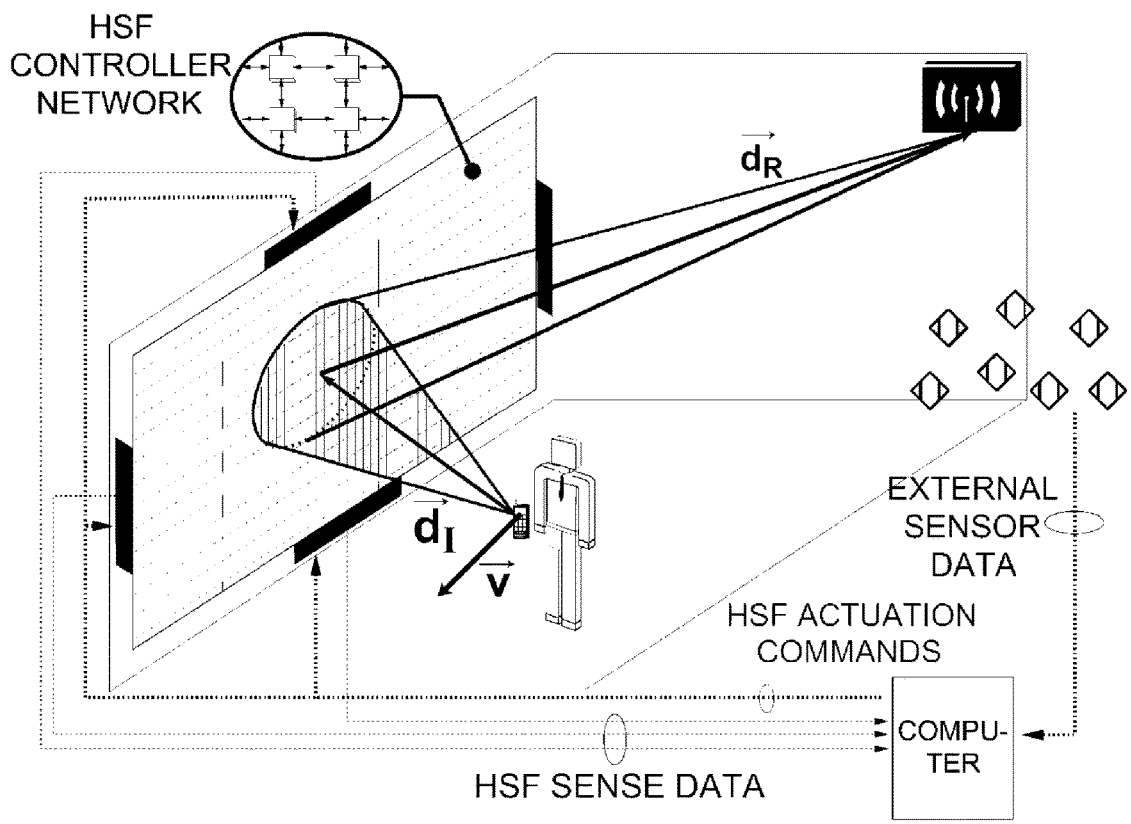
FIG. 12 shows an HyperSurface end-functionality and interconnectivity with external networked entities.

FIG. 12 illustrates the complete control loop that can be employed to achieve the described lens effect, in a mobile device-to-base station communication scenario. (For ease of exposition a single communicating pair is considered. The case of multiple communicating pairs can also be considered, taking into account cross interference.) The wave attributes impinging on the HyperSurface coating, such as phase or power, are measured by corresponding sensors and are forwarded by the Controller network to an external server. The server can combine these data with the input from other sensors within the space. Such external data can exemplary include the estimated device position, its mobility pattern and device type identification to derive its nominal wireless module characteristics, such as antenna radiation pattern.

The combination of internal and external data can yield the estimated incident direction dI (in vector form). Knowing the location of the base station, the server can then calculate the optimal HyperSurface function deployment that will reflect the incident wave towards the direction dR (in vector form). The functions are compiled at the server, and the corresponding actuation commands are sent to the HyperSurface. Note that more than one HyperSurface gateways can be employed, to facilitate the timely execution of sensing and actuating tasks.

Apart from the described lens operation, HyperSurfaces can offer several additional applications to wireless communication optimization, with promising benefits in communication performance, energy and spectral efficiency:

Wave routing: The propagation paths connecting a node pair can be dynamically defined to avoid obstacles within an environment. For instance, propagation paths can be steered around opaque objects, increasing the received power. The paths can be adapted to node mobility patterns, following their predicted locations in real time.

Environment learning: HyperSurfaces may initially be unaware of the propagation paths offered by an environment. A learning system can learn the offered wave routes to connect two points within a space. Such a system can start with a trial and error approach, and gradually gather experience regarding the offered wave routes. Using the accumulated experience, the optimal wave routes for communicating node pairs can then be deployed within the space.

Virtual line-of-sight: The absence of a line-of-sight path connecting two nodes is well-known to result in fast fading, where the amplitude and phase change imposed by the channel vary considerably over the period of use, degrading the link quality. The cause of this phenomenon is that none of the multiple propagation stands out in terms of the received power. The fading can be modeled by a Rayleigh distribution [4a]. As a counter measure, a HyperSurface configuration can ensure that one of the multiple paths always carries considerable more power than the rest, essentially mimicking a line-of-sight case. The power ratio of the dominant path over the rest is known as the Rice factor [4a]. Thus, an optimization objective could be to maximize the minimum Rice factor within an environment, using proper HyperSurface configurations.

The approach can be generalized as propagation path shaping, where the objective is to provide a custom power-delay profile at a given point in the environment, to the benefit of Multiple-Input Multiple Output arrangements [13a].

Adaptive wireless coverage: The HyperSurfaces can be tuned to focus or scatter impinging waves within an environment, with the objective of providing optimal wireless coverage. The covered area can be adapted to the presence of mobile devices. Additionally it may consider the application requirements running on them, resulting, e.g., into a guaranteed minimum signal power level restriction for the HyperSurface configuration.

Interference minimization: The lens operation illustrated in FIG. 11 has an additional benefit, apart from path loss mitigation. As shown in the right inset, parts of the environment are unaffected by the transmission, receiving no portion of the transmitted energy. Devices present at these parts will experience less interference than in the left inset case, benefiting their overall communication quality. Minimizing the interference among devices present within an environment can be an objective when configuring the deployed HyperSurfaces.

Human exposure and Healthcare Awareness: The interference minimization can also be viewed from the more specific scope of Healthcare awareness. Recently, public bodies have begun imposing limits to the human exposure to RF, microwave and millimeter wave electromagnetic radiation [14a]. The maximum radiated power limits, which were previously loosely regulated, undergo a sharp and steady decrease over the past years and could be soon enforced by legislature in certain countries. Thus, the trend is to reduce the transmission power of base stations, while increasing their numbers to sustain proper signal coverage. Nonetheless, the environment still intervenes as a probabilistic factor, which can negatively affect both the attained exposure and signal coverage levels. HyperSurfaces can be employed to ensure more fine-grained spatial control over both objectives.

Physical-layer security: Interference minimization can also be viewed from the security aspect. A research direction called physical-layer security seeks to ensure that wireless signals cannot be received by an intruder at physical level [15a]. Thus, these signals cannot be intercepted, blocking eavesdropping attempts. The key-idea behind the ongoing studies is to use information encoding schemes that require high signal-to-noise ratio levels for proper decoding. HyperSurfaces can complement this effort by ensuring minimal received signal levels at unwanted environment parts. Additionally, using wave routing, information can be routed via improbable or even fast-changing paths, hindering eavesdropping further.

The aforementioned applications are expected to result in significant connectivity quality boost for wireless devices. Moreover, the path loss mitigation can translate to a reduction in transmission power requirements, favoring energy efficiency. Interference mitigation can offer not only increased data rates, but a better spectrum use as well. It is noted that such traits are aligned to the envisioned 5G objectives of ultra-low low-latency, high bandwidth, and support for massive numbers of devices within an environment [16a]. Research is presently conducted towards meeting these objectives via device hardware and protocol upgrades. The HyperSurfaces can work in a complementary direction, by making the environment of the devices customizable and, therefore, optimizable.

Additionally, the potential stemming from combining HyperSurfaces with beamforming at the device-side is highlighted. Beamforming is a device capability, mobile or base station, to alter the radiation pattern of its antenna system, during its operation, in order to match a given optimization criterion. It is typically achieved by using a 1-D or 2-D array of antennas, whose transmit/receive gain is regulated as required to receive or transmit energy in one or more specified directions [13a]. In general, beamforming represents the device vantage point in mitigating multi-path propagation issues, treating the environment in-between the end-points as a probabilistic, uncontrollable factor. On the other hand, HyperSurfaces act from the environment point-of-view, making its behavior more deterministic, adapting it better to the device needs. Thus, beamforming and HyperSurfaces can act complimentary, providing control over the complete wireless channel, device end-points and environment included.

V. A Macroscopic Hypersurface Model

The major HyperSurface components and their interactions are defined in the following via a parametric model. A goal is to provide an initial, function-oriented model, abstracting the physics, which will enable the further exploration of the HyperSurface concept in network optimization studies. A control layer model is responsible for managing the state of functions. Specific realizability options, i.e., ways of specifying the model parameter values and the involved challenges, are discussed in Section VI.

Figure 13:
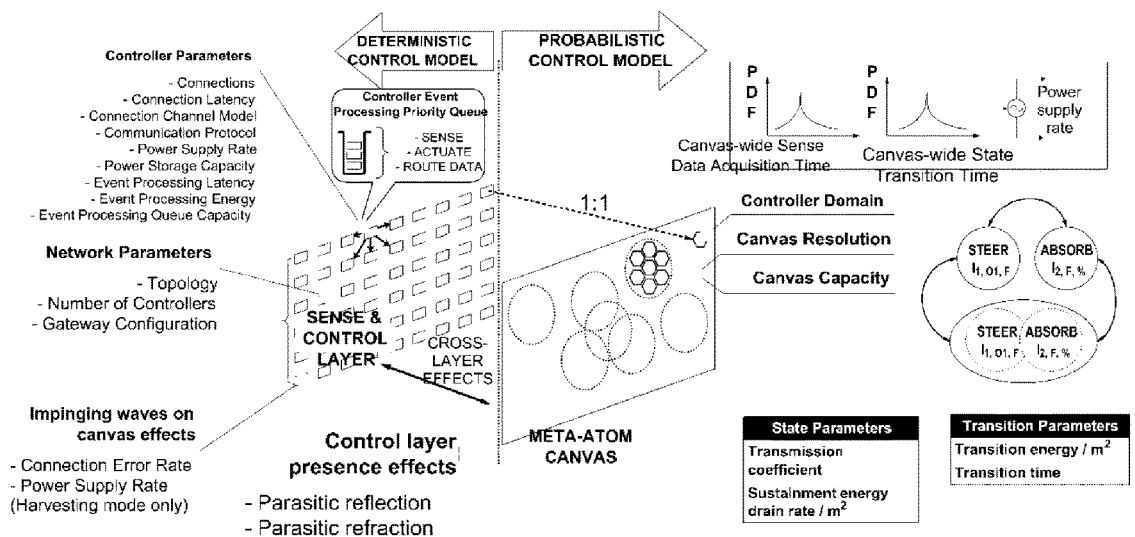
FIG. 13 shows a macroscopic model describing the connection between the offered HyperSurface functionalities and the underlying control layer considerations.

The proposed model is illustrated in FIG. 13 and it considers the Meta-atom canvas and the Distributed Sense and Control layers. For the latter, a deterministic and an alternative, probabilistic model are detailed.

The Meta-atom Canvas model considers the Function Area and Controller Domain concepts introduced in FIGS. 9 and 4. Function Areas comprise several Domains, and their form can freely take any shape that complies with this condition. Notice that the Domain size is a design consideration: the power supply of a Controller must be enough to support the active elements contained in its Domain. Additionally, the concept of canvas resolution is introduced, which is the smallest meta-atom pattern that can be formed on the canvas. The canvas resolution also defines the maximum impinging wave carrier frequency that can interact with the HyperSurface. In general, the canvas resolution is smaller than the Controller Domain area, in the sense that a Domain may contain one or more meta-atoms.

The range of all formable Meta-atom patterns is captured in the form of a state chart, as shown in FIG. 10. A single state represents one Function with specific input values, such as steering a given direction of arrival, $I_1$, towards a specific outgoing direction, $O_1$, for a specific frequency F. Complex states correspond to multiplexed functions, conceptually translating to different meta-atoms within a Domain, such as steering a given direction of arrival, $I_1$, and partially absorbing another, $I_2$, at the same time.

Each state is assigned a transmission coefficient and a sustainment energy drain parameter. The transmission coefficient describes the alterations in amplitude, phase, intensity, or total power of a wave impinging on an area set a given state (whereas the HyperSurface Functions refer to the direction alteration). The sustainment energy drain represents the power required to maintain an area at a given state, by keeping the contained therein active elements to their intended status. This sustainment energy drain depends on the technology employed to manufacture the canvas. CMOS switch-based active element designs require a constant power supply [17a]. MEMS-based switch designs can exhibit some limited state persistence [18a]. Mechanical switches are fully state persistent and incur zero energy drain for state sustainment [19a].

Finally, each transition is assigned a transition energy and a transition time parameter. The transition energy describes the total energy reserve that one or more controllers must expend to alter the state of a function area, by changing the states of the active elements accordingly. The transition time is time required to complete this action, once the execution of the corresponding controller directive has begun.

In the following, the modeling of the Distributed Sense and Control layer is discussed:

The deterministic model considers a network of identical controllers, as shown on the left part of FIG. 13. The topology is as expected, periodic, and the exact number of nodes (controllers) that comprise it, is derived via dividing the total HyperSurface by the Controller Domain size. One or more nodes serve as gateways, connecting the network to the external world. The definition of gateways is an optimization consideration: more gateways offer redundancy and network load distribution, but require more physical connections between the HyperSurface and the external world. Alternatively, the gateway nodes may be fixed by design and have more complex hardware than the regular controllers.

Each separate node has a set of parameters describing its communication capabilities, power supply and processing capabilities. Regarding the communication capabilities, a standard model of links/connections is applied, which is generic to cover wired and wireless controller networking scenarios. The data packets exchanged among nodes are expected to have minimal size, aligned to the expectation for low cost/limited hardware capabilities of the nodes. Moreover, the distances between nodes are expectedly very short [9a]. Therefore, the connection bandwidth may not be a significant parameter, given that packet transmissions could be considered instantaneous. Nonetheless, a latency link parameter is introduced, which can optionally take the propagation delay concern into account. Link channel models are employed to capture transmission failures. The Power supply model accounts for external energy feed or harvesting-based approaches [20a], including Wireless Power Transfer [21a]. The power storage capacity parameter can capture the presence of batteries per node, if allowed by their dimensions, or simple capacitors that can temporarily hold an amount of energy, e.g., sufficient for altering the state of the controller domain once, upon demand.

The processing core of each node is modeled as a priority queue that holds events to be dispatched. This corresponds to a single-task processing model, which is aligned to the low hardware complexity consideration for the controllers. The queue holds event markers and data, uniformly modeled as packets. The processing of a SENSE packet type represents a measurement reading from the controllers sensors, resulting into a new data packet that is subsequently enqueued. An ACTUATE packet is data packet containing directives to alter the state of the controller's canvas domain. The directives are executed and the packet is consumed. A ROUTE DATA event corresponds to a data packet that is to be forwarded to another controller or towards a gateway, according to the employed communication protocol. The controller hardware assigns priorities to the events and handles queue overflows or processing deadlines. Each event processing incurs a latency and an energy consumption, which are captured by the respective parameters. Should a controller's power supply be depleted, the queue contents and the domain state may be lost, since persistence requires permanent storage, increasing the hardware complexity and cost.

It is interesting to note that cross-interactions between the canvas and the control layer are possible. Waves impinging upon the canvas may cause interference to the controller communication, especially when they operate in a wireless manner. The same impinging energy, however, may benefit the controllers' power supply in harvesting mode.

The described deterministic model can account for the major factors affecting the operation of a HyperSurface, but requires the simulation of two different domains: i) the wireless communication effects, using ray-tracing engines (e.g., [22a]) to involve the meta-atom canvas, and ii) the canvas management, using network simulation software to describe the controllers' effect. Under certain assumptions, however, the model can be simplified, using a probabilistic view of the control layer.

The probabilistic model considers the performance of the control layer as a whole, and not the individual controller operation. To this ends, the canvas-wide sense data acquisition and the canvas-wide state transition times are defined and treated via probability distributions, as shown at the right-top of FIG. 13 (or other stochastic modeling, either more complex or simpler, such as average values). The former describes the time required to obtain the impinging wave attributes for the complete HyperSurface area, making it available at the gateways for further processing. The latter describes the time required to set the canvas to an intended function deployment setup, once the corresponding directives have arrived at the gateways. Finally, an aggregate power supply source can model the energy that is fed to the canvas, to sustain or alter its state.

Given that the state of single controllers is not taken into account by the probabilistic model, it cannot account for the HyperSurface end-behavior (i.e., the offered functions) when controllers fail due to event congestion, communication errors or power shortage. For the first two failure factors, it can be assumed that the hardware and communication protocol meet these specifications by their design, avoiding massive failures that could significantly affect the HyperSurface operation. Likewise, the probabilistic model remains valid only when the HyperSurface power budget remains balanced or positive. In other words, assuming $E_{in}$ is the total power supply rate, C denotes the controller domain (with area $\alpha$), S(C) the state of domain C for a given function deployment and $E_C^{S(C)}$ the state sustainment energy drain, it must hold that:

$$\varepsilon_{in} \geq \alpha \cdot \sum_{\forall C} \varepsilon_C^{S(C)} \qquad (1)$$

When energy harvesting is supported by the HyperSurface, part of the energy requirements may be covered by absorbed impinging waves. In essence, this approach exploits the cross-layer effects in a positively manner. The energy budget condition (1) can then be exemplary rewritten as:

$$\varepsilon_{in} + \alpha \cdot \sum_{\forall C: S(C) = ABSORB} \mathcal{G}_C \geq \alpha \cdot \sum_{\forall C} \varepsilon_C^{S(C)} \qquad (2)$$

where G represents the energy gained via absorption. $E_{in}$ continues to represent energy supply sources that are independent from the HyperSurface state, while the right part of condition (2) continues to consider the sustainment energy for all domains, including the ones set to absorb. This approach constitutes the function deployment definition a joint problem, seeking to optimize the wireless communication of devices, while supporting the energy budget of the HyperSurface at the same time.

Finally, when the objective is to define the boundary effects of HyperSurfaces on wireless communications, the probabilistic model can be simplified further. First, the canvas-wide state acquisition and transition can be considered instantaneous. Second, the HyperSurface power budget can be considered as always balanced. Third, the cross-layer effects can be disregarded, assuming perfect isolation between the control layer and the canvas. Under these assumptions, the effective parameters are limited to the canvas resolution and the canvas capacity, i.e., the supported states and transitions. The state transmission coefficient can be taken into account, while other state and transmission parameters are disregarded due to the ideal power supply and response time assumptions. This boundary-case model can be easily incorporated to ray-tracing software, as exemplary shown in FIG. 11, e.g., with the sole objective of deploying the best combination of functions that optimizes the communication attributes of a set of devices.

Figure 14:
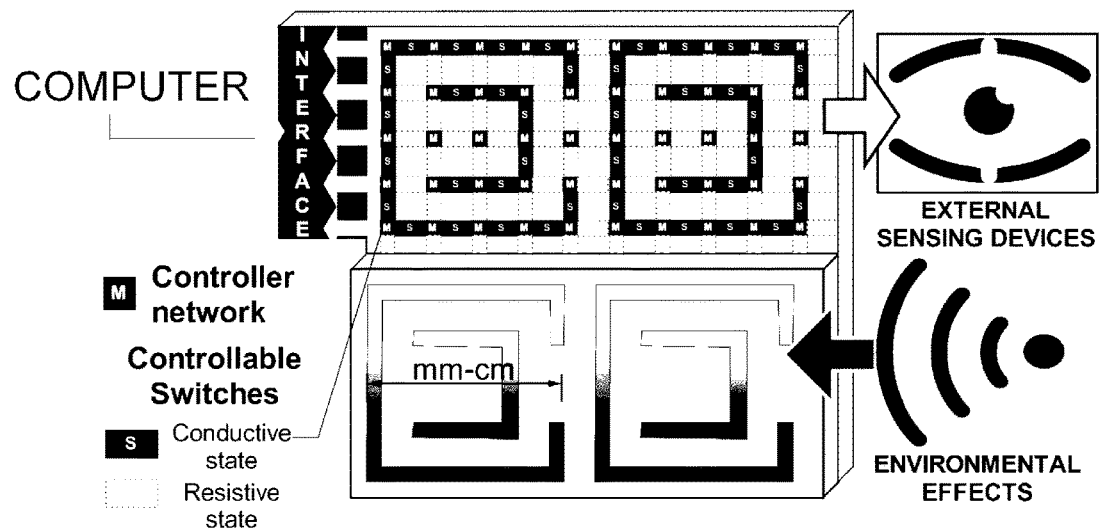
FIG. 14 shows an example how the meta-atoms can be switched based on data acquired from external sensing devices.

To summarize the above, FIG. 14 shows an overview of the principles that may be applied to each of the embodiments described herein. FIG. 14 shows an example how the meta-atoms can be switched based on data acquired from external sensing devices. The external sensing devices may refer to one or more remote sensors described herein. In the upper part of FIG. 14, it is shown how the meta-atoms can be set to a particular desired pattern. The desired pattern is achieved by putting a particular subset of the controllable switches of the meta-atoms of the HyperSurface into a conductive state and the other switches into a resistive state. Accordingly, a continuous conductive area is provided which acts as a meta-atom showing a desired interaction with an impinging electromagnetic wave. In the lower part of FIG. 14, the resulting desired pattern of meta-atoms is shown. It is further indicated in FIG. 14 that the meta-atoms have a size (along both a horizontal and a vertical axis) in the mm to cm range. In general, the size of a meta-atom is smaller than the wavelength of the electromagnetic wave impinging on the meta-atom.

VI. Realizability

Figure 8:
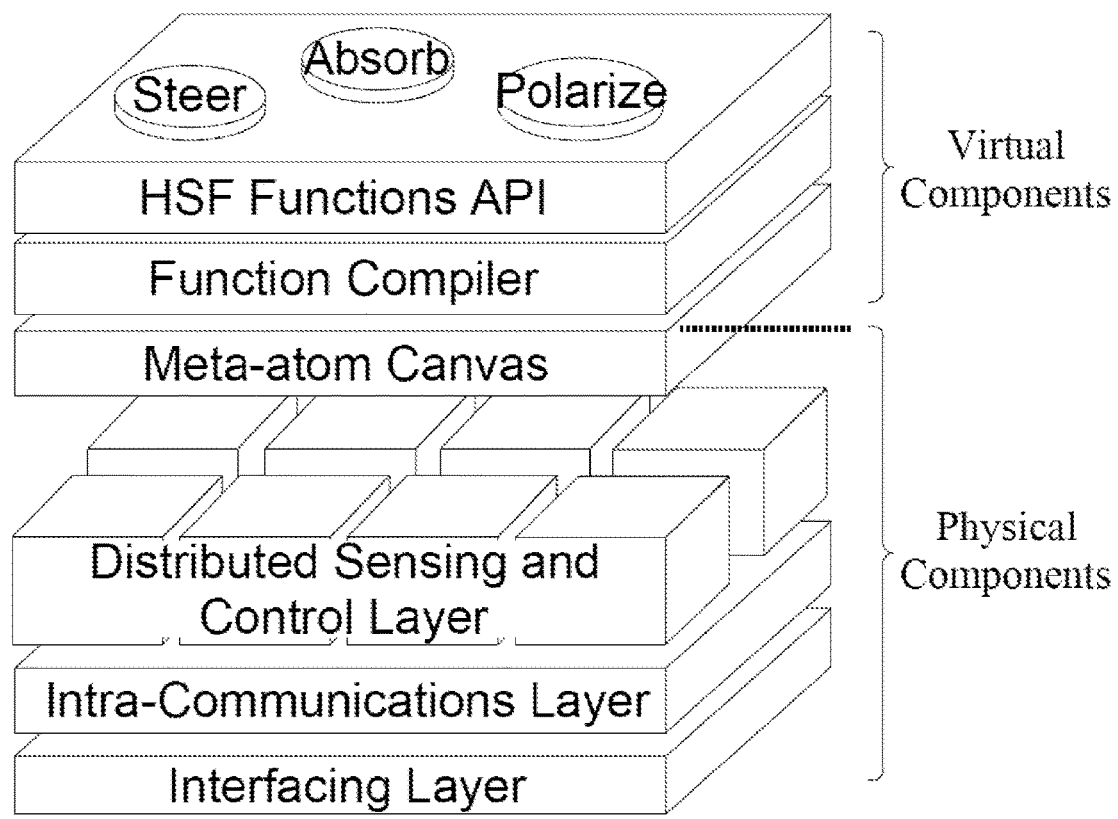
FIG. 8 shows physical and virtual layers comprising a HyperSurface according to the present disclosure.

Realizing HyperSurfaces requires the implementation of their physical and virtual components illustrated in FIG. 8. The current status and future prospects of each layer are discussed below.

The Meta-atom Canvas: Multiple works have proposed tunable canvas designs, based on different active elements, each fit for various high-level functions and spectrum regimes. Examples include: (i) THz designs tuned by MEMS actuators, (ii) magnetoelastic microwave metamaterials driven by Ampere's force, (iii) reconfigurable optical metadevices based on flexible strips or nanowires cut from membranes of nanoscale thickness, (iv) thermally reconfigurable metasurfaces driven by differential thermal expansion between gold and silicon nitride layers, (v) electro-optical modulator metasurface driven by electrostatic forces between oppositely charged nanowires, (vi) All-optical modulator plasmonic metasurface actuated by a milliwatt of light power at telecom wavelengths, (vii) spatial light modulators: electrically addressable metadevices, randomly reconfigurable in one dimension, (viii) "digital" metasurfaces, describing a class of meta-atoms that can be actively switched between two opposite electromagnetic states, and more [23a]. Such meta-atom canvas setups have been implemented and evaluated in practice, thus passing the proof of concept phase [9a].

Existing meta-atom canvases offer impressive tunability, wherein each focuses on specific functions and input/output parameter ranges [9a]. An ideal canvas would support the complete range of input/output angles and a wide range of functions, potentially spatially multiplexed over the HyperSurface, as shown in FIG. 9. Moreover, this ideal canvas should yield minimal tuning times, i.e., the time interval between receiving a function directive and its actual deployment, and high spatial resolution for function deployment.

The Function Compiler: Translating high-level HyperSurface functions to low-level actuations by the active elements of a canvas requires a modular understanding of metasurface Physics. Existing approaches provide: i) Analytical models describing the high-level functionality of a given canvas [5a], and ii) Circuit-equivalents of canvases, which are able to describe metasurface characteristic such as surface impedance and resonance [24a].

An alternative approach for the Compiler implementation is the use of learning systems, enabled by the connectivity of HyperSurfaces. Optimization algorithms can relate a set of required metasurface functions to the optimal states of the active elements on a canvas, creating a basic lookup table. Genetic algorithms or simulated annealing constitute well-known examples of applicable optimizers among a multitude of similar solutions [25a]. Reinforcement learning systems, such as neural networks, can then be trained using the lookup table entries, and be used to yield new, extrapolated function-to-state solutions upon demand [26a]. It is noted that existing analytical conclusions may be used for speeding up the optimization and learning process, by early rejecting non-promising candidate relations.

The lookup table creation and learning system training process can take place at the HyperSurface design phase, using accurate Physics simulations (e.g., Finite Difference-Time Domain [22a]), or after manufacturing, using real field measurements. The outcome of the training can then be supplied as accompanying software for the HyperSurface deployment. It is noted that the learning process can also be used for evaluating the capabilities (i.e., functions and parameter range) of a particular HyperSurface canvas design as well.

Distributed Control and Intra-Network layers: The hardware architecture and communication protocol stack of the Distributed Sense and Control layer should respect several criteria. First, the controller nodes, their numbers, topology, communication power supply style should not interfere with the meta-atom canvas operation. For instance, the presence of power supply lines or wired communication channels should not cause unwanted reflections of the waves impinging to the HyperSurface. Second, the chosen architecture should promote ease of HyperSurface deployment. For instance, a minimal-sized node with wireless capabilities might allow for: i) flexible HyperSurface membranes that can be easily used as object coating, or ii) HyperSurface tiles that can be used to cover planar surfaces, such as walls, as needed. Finally, manufacturing cost should ideally be kept minimal, to promote large-scale deployments over wide surfaces within an environment. In general, miniaturized, wireless nodes with harvesting-based power supply would be the ideal answer to the aforementioned technical challenges. Nonetheless, and depending on the application, wired nodes with external power supply may constitute viable choices (It is noted that application scenarios that require small-sized HyperSurfaces, may not need a controller network. A single controller domain may suffice for controlling the complete surface area.).

Realizing the Distributed Control layer can benefit from the existing knowledge, hardware and software platforms for Wireless Sensor Networks (WSN), Networks on Chips (NoCs) and Nanonetworks.

WSNs constitute mature technology that offers controller interconnectivity, a multitude of hardware platforms of varying size, cost and capabilities [27a]. WSN nodes have a typically large size of some cm (with a goal towards mm-sized ones), but offer mature hardware and network protocol support. Their communication style ranges from THz, to VHF, to wired solutions, and their power supply from battery based, to wireless power transfer, to energy harvesting modes. Well-studied, lightweight networking protocols (as, e.g., AODV) have been extensively adapted to low- and high-load scenarios, and have been optimized for objectives such as lifetime maximization, latency minimization, coverage and more. WSN gateways readily offer interconnectivity to the external world, supporting a wide range of popular and standardized protocols. The cost of WSN is presently affordable for large-scale deployments [28a].

The NoC architecture is employed for interconnecting computing units over a single chip. The network nodes are smaller than in WSNs, typically sized at mm [29a], and are normally wire-connected. They support high-throughput and low-latency operation at the expense of higher manufacturing cost and external power supply. The sophistication and scalability of the networking protocols is limited, given that they have a very specific purpose: to interconnect a bounded number of processing units [30a]. Wireless-NoCs are the wireless counterpart of NoCs, offering placement versatility [31a].

Nanonetworks epitomize miniaturization, while sacrificing performance. Nano-nodes are nm to µm-sized, and support wireless communication only at the THz or VHF regime [32a]. The power supply relies on energy-harvesting or Wireless Power Transfer [21a]. While complete prototypes are yet to be built, it is theorized that the CPU, RAM and communications capabilities of nanonodes will be extremely limited, due to "weak" hardware and severe power restrictions [33a]. Several communication protocol approaches have been proposed, taking into account these restrictions [34a], [35a]. Despite their limitations, nanonetworks can offer a truly ambient HyperSurface control layer. Essentially, nanonodes can be considered as incorporated to the active elements of a canvas, minimizing their interference with the metasurface functionalities.

Functions API and External Interfacing layers: The abstractions imposed by the Functions API are meant as a way of providing an easy-to-use interface to network designers and operators. Moreover, the external Interfacing Layer enables the HyperSurface inter-connectivity to other network components, enabling a joint network-environment optimization. A posed challenge is the API and interface design principles that should be followed to promote ease of use (e.g., combining functions to compose re-usable, higher level modules) and wide compatibility to the ecosystem of network equipment.

To define a resolution approach, we note that the abstractions imposed by the HyperSurface function API is aligned to the control/data plane decoupling effort in modern communication systems. This provides a natural way of incorporating HyperSurfaces to existing systems via Software-Defined Networking (SDN) [36a]. SDN advocates for the decoupling of network control from the underlying hardware, and performs all network optimization tasks in software, at a central point with network-wide visibility (SDN controller). The network control presently refers to wired/wireless network hardware, such as routers, switches and base stations. Moreover, the network optimization tasks, such as load balancing and data routing [37a], are modeled as modular software applications, which can be centrally ran and combined as needed. In a similar manner, the described HyperSurface functionalities can be also be modeled as software applications at SDN controllers, providing the complementary softwarization of the wireless environment as well.

The advantages of using a HyperSurface setup as compared to a "plain setup" (in which no HyperSurfaces and no controllable meta-atoms are used) has been proven by simulation (more precisely, by raytracing simulation) both for a 2.4 GHz case (e.g. relevant for WiFi setups) and a 60 GHz case (e.g. relevant for upcoming 5G communications) by considering 12 receivers arranged in an indoor environment.

VII. Conclusion

The present disclosure introduced a novel class of planar objects, whose interaction with impinging electromagnetic waves can be defined via software. These objects, named HyperSurfaces, are an advanced form of metasurfaces, planar, artificial materials whose electromagnetic behavior depends on their internal structure, and can exhibit even unnatural properties. Hyper-Surfaces incorporate networked sense and control elements within a metasurface design, matching its internal structure to an expected set of high-level electromagnetic functions. A strong software abstraction layer enables HyperSurfaces to interact with external network elements in an extensible and easy-to-use manner. Subsequently, the study proposed the use of HyperSurfaces to softwarize the propagation environment of wireless communications. HyperSurface-coated objects, such as walls, can adapt their electromagnetic behavior to the benefit of wireless communication devices, providing for the first time control over the entire communication channel, devices and environment included. The novel capabilities offered by this approach were discussed, and the corresponding HyperSurface architecture was detailed. The realizability of Hyper-Surfaces was supported, detailing the current manufacturability of each separate component. A macroscopic model was provided for studying the HyperSurface effects on wireless communications further. Finally, future research directions were drawn and matched with promising methodologies and tools.

REFERENCES

[1] Adnan Aijaz, Meryem Simsek, Mischa Dohler, Gerhard Fettweis: Shaping 5G for the Tactile Internet in 5G Mobile Communications. Springer, 2017.
[2] Paul Ferrand, Mustapha Amara, Stefan Valentin, Maxime Guillaud: "Trends and challenges in wireless channel modeling for evolving radio access", IEEE Communications Magazine, pp. 93-99, 2016.
[3] Bo Han, Vijay Gopalakrishnan, Lusheng Ji, Seungjoon Lee: "Network function virtualization: Challenges and opportunities for innovations", IEEE Communications Magazine, pp. 90-97, 2015.
[4] S. Han, K. G. Shin: Enhancing Wireless Performance Using Reflectors in INFOCOM 2017.
[5] Kao-Cheng Huang, Zhaocheng Wang: Millimeter wave communcation systems. Wiley, 2011.
[6] Younsun Kim, Hyoungju Ji, Juho Lee, Young-Han Nam, Boon Loong Ng, Ioannis Tzanidis, Yang Li, Jianzhong Zhang: "Full dimension mimo (FD-MIMO): the next evolution of MIMO in LTE systems", IEEE Wireless Communications, pp. 26-33, 2014.
[7] Seung Hoon Lee, Muhan Choi, Teun-Teun Kim, Seungwoo Lee, Ming Liu, Xiaobo Yin, Hong Kyw Choi, Seung S. Lee, Choon-Gi Choi, Sung-Yool Choi, Xiang Zhang, Bumki Min: "Switching terahertz waves with gate-controlled active graphene metamaterials", Nature Materials, pp. 936-941, 2012.
[8] Daecheon Lim, Dongju Lee, Sungjoon Lim: "Angle- and Polarization-Insensitive Metamaterial Absorber using Via Array", Scientific reports, pp. 39686, 2016.
[9] S. Lucyszyn: Advanced RF MEMS. Cambridge University Press, 2010.
[10] Alexander E. Minovich, Andrey E. Miroshnichenko, Anton Y. Bykov, Tatiana V. Murzina, Dragomir N. Neshev, Yuri S. Kivshar: "Functional and nonlinear optical metasurfaces: Optical metasurfaces", Laser & Photonics Reviews, pp. 195-213, 2015. URL http://doi.wiley.com/10.1002/lpor.201400402.

[11] Marvin K. Simon, Mohamed-Slim Alouini: Digital communication over fading channels. John Wiley & Sons, 2005.

[12] The~VISORSURF~project: "A Hardware Platform for Software-driven Functional Metasurfaces", Horizon 2020 Future Emerging Technologies, 2017. URL http://visorsurfeu.

[13] Christos Verikoukis, Roberto Minerva, Mohsen Guizani, Soumya Kanti Datta, Yen-Kuang Chen, Hausi A. Muller: "Internet of Things: Part 2", IEEE Communications Magazine, pp. 114-115, 2017.

[14] Cheng-Xiang Wang, Xuemin Hong, Xiaohu Ge, Xiang Cheng, Gong Zhang, John Thompson: "Cooperative MIMO channel models: A survey", IEEE Communications Magazine, 2010.

[15] Alexander Y. Zhu, Arseniy I. Kuznetsov, Boris Luk'yanchuk, Nader Engheta, Patrice Genevet: "Traditional and emerging materials for optical metasurfaces", Nanophotonics, 2017. URL http://www.degruytercom/view/j/nanoph.2017.6.issue-2/nanoph-2016-0032/nanoph-2016-0032.xml.

[1a] P. Ferrand, M. Amara, S. Valentin, and M. Guillaud, "Trends and challenges in wireless channel modeling for evolving radio access," IEEE Communications Magazine, vol. 54, no. 7, pp. 93-99, 2016.

[2a] The VISORSURF project, "A Hardware Platform for Software-driven Functional Metasurfaces," Horizon 2020 Future Emerging Technologies, 2017. [Online]. Available: http://visorsurf.eu

[3a] C. L. Holloway, M. G. Cotton, and P. McKenna, "A model for predicting the power delay profile characteristics inside a room," IEEE Transactions on Vehicular Technology, vol. 48, no. 4, pp. 1110-1120, 1999.

[4a] M. K. Simon and M.-S. Alouini, Digital communication over fading channels. John Wiley & Sons, 2005, vol. 95.

[5a] C. L. Holloway, E. F. Kuester, J. A. Gordon, J. O'Hara, J. Booth, and D. R. Smith, "An Overview of the Theory and Applications of Metasurfaces: The Two-Dimensional Equivalents of Metamaterials," IEEE Antennas and Propagation Magazine, vol. 54, no. 2, pp. 10-35, 2012. [Online]. Available: http://ieeexplore.ieee.org/document/6230714/

[6a] H.-T. Chen, A. J. Taylor, and N. Yu, "A review of metasurfaces: physics and applications," Reports on progress in physics. Physical Society (Great Britain), vol. 79, no. 7, p. 076401, 2016.

[7a] C. Liaskos, A. Tsioliaridou, A. Pitsillides, I. F. Akyildiz, N. Kantartzis, A. Lalas, X. Dimitropoulos, S. Ioannidis, M. Kafesaki, and C. Souk-oulis, "Design and Development of Software Defined Metamaterials for Nanonetworks," IEEE Circuits and Systems Magazine, vol. 15, no. 4, pp. 12-25, 2015.

[8a] K. Iwaszczuk, A. C. Strikwerda, K. Fan, X. Zhang, R. D. Averitt, and P. U. Jepsen, "Flexible metamaterial absorbers for stealth applications at terahertz frequencies," Optics Express, vol. 20, no. 1, p. 635, 2012.

[9a] A. Y. Zhu, A. I. Kuznetsov, B. Luk'yanchuk, N. Engheta, and P. Genevet, "Traditional and emerging materials for optical metasurfaces," Nanophotonics, vol. 6, no. 2, 2017. [Online]. Available: http://www.degruyter.com/view/j/nanoph.2017.6.issue-2/nanoph-2016-0032/nanoph-2016-0032.xml

[10a] A. E. Minovich, A. E. Miroshnichenko, A. Y. Bykov, T. V. Murzina, D. N. Neshev, and Y. S. Kivshar, "Functional and nonlinear optical metasurfaces: Optical metasurfaces," Laser & Photonics Reviews, vol. 9, no. 2, pp. 195-213, 2015. [Online]. Available: http://doi.wiley.com/10.1002/lpor.201400402

[11a] B. Banerjee, An introduction to metamaterials and waves in composites. Boca Raton, Fla.: CRC Press/Taylor & Francis Group, 2011.

[12a] S. Lucyszyn, Advanced RF MEMS, ser. The Cambridge RF and microwave engineering series. New York: Cambridge University Press, 2010.

[13a] Y. Kim, H. Ji, J. Lee, Y.-H. Nam, B. L. Ng, I. Tzanidis, Y. Li, and J. Zhang, "Full dimension mimo (FD-MIMO): the next evolution of MIMO in LTE systems," IEEE Wireless Communications, vol. 21, no. 2, pp. 26-33, 2014.

[14a] J. C. Lin, "Human Exposure to RF, Microwave, and Millimeter-Wave Electromagnetic Radiation [Health Effects]," IEEE Microwave Magazine, vol. 17, no. 6, pp. 32-36, 2016.

[15a] A. Chorti, S. M. Perlaza, Z. Han, and H. V. Poor, "Physical layer security in wireless networks with passive and active eavesdroppers," in GLOBECOM 2012-2012 IEEE Global Communications Conference, pp. 4868-4873.

[16a] A. Aijaz, M. Simsek, M. Dohler, and G. Fettweis, "Shaping 5G for the Tactile Internet," in 5G Mobile Communications. Springer, 2017, pp. 677-691.

[17a] Y. B. Li, L. L. Li, B. B. Xu, W. Wu, R. Y. Wu, X. Wan, Q. Cheng, and T. J. Cui, "Transmission-Type 2-Bit Programmable Metasurface for Single-Sensor and Single-Frequency Microwave Imaging," Scientific reports, vol. 6, p. 23731, 2016.

[18a] H. Tao, A. C. Strikwerda, K. Fan, W. J. Padilla, X. Zhang, and R. D. Averitt, "MEMS Based Structurally Tunable Metamaterials at Terahertz Frequencies," Journal of Infrared, Millimeter, and Terahertz Waves, vol. 32, no. 5, pp. 580-595, 2011.

[19a] T. Bückmann, N. Stenger, M. Kadic, J. Kaschke, A. Frolich, T. Ken-nerknecht, C. Eberl, M. Thiel, and M. Wegener, "Tailored 3D mechanical metamaterials made by dip-in direct-laser-writing optical lithography," Advanced materials, vol. 24, no. 20, pp. 2710-2714, 2012.

[20a] J. Jornet and I. Akyildiz, "Joint Energy Harvesting and Communication Analysis for Perpetual Wireless Nanosensor Networks in the Terahertz Band," IEEE Transactions on Nanotechnology, vol. 11, no. 3, pp. 570-580, 2012.

[21a] P. Theilmann, "Wireless power transfer for scaled electronic biomedical implants," Ph.D. dissertation, UC San Diego: b7322770, 2012.

[22a] K. Kantelis, S. Amanatiadis, C. Liaskos, N. Kantartzis, N. Konofaos, P. Nicopolitidis, and G. Papadimitriou, "On the Use of FDTD and Ray-Tracing Schemes in the Nanonetwork Environment," IEEE Communications Letters, vol. 18, no. 10, pp. 1823-1826, 2014.

[23a] N. I. Zheludev and E. Plum, "Reconfigurable nanomechanical photonic metamaterials," Nature nanotechnology, vol. 11, no. 1, pp. 16-22, 2016.

[24a] J. D. Baena, J. Bonache, F. Martin, R. M. Sillero, F. Falcone, T. Lopetegi, M. A. G. Laso, J. Garcia-Garcia, I. Gil, M. F. Portillo et al., "Equivalent-circuit models for split-ring resonators and complementary split-ring resonators coupled to planar transmission lines," IEEE transactions on microwave theory and techniques, vol. 53, no. 4, pp. 1451-1461, 2005.

[25a] S. Luke, Essentials of metaheuristics, 1st ed. [Si.]: Lulu, 2009.

[26a] J. Su, J. Liu, D. B. Thomas, and P. Y. K. Cheung, "Neural Network Based Reinforcement Learning Acceleration on FPGA Platforms," ACM SIGARCH Computer Architecture News, vol. 44, no. 4, pp. 68-73, 2017.

[27a] P. Rawat, K. D. Singh, H. Chaouchi, and J. M. Bonnin, "Wireless sensor networks: a survey on recent developments and potential synergies," The Journal of supercomputing, vol. 68, no. 1, pp. 1-48, 2014.
[28a] K. Xu, Q. Wang, H. Hassanein, and G. Takahara, "Optimal wireless sensor networks (WSNs) deployment: minimum cost with lifetime constraint," in Wireless and Mobile Computing, Networking and Communications, 2005. (WiMob'2005), IEEE International Conference on, vol. 3, 2005, pp. 454-461.
[29a] S. Abadal, M. Iannazzo, M. Nemirovsky, A. Cabellos-Aparicio, H. Lee, and E. Alarcón, "On the Area and Energy Scalability of Wireless Network-on-Chip: A Model-Based Benchmarked Design Space Exploration," IEEE/ACM Transactions on Networking, p. 1, 2014.
[30a] S. Abadal, E. Alarcon, A. Cabellos-Aparicio, M. Lemme, and M. Nemirovsky, "Graphene-enabled wireless communication for massive multicore architectures," IEEE Communications Magazine, vol. 51, no. 11, pp. 137-143, 2013.
[31a] S. Deb, A. Ganguly, P. P. Pande, B. Belzer, and D. Heo, "Wireless NoC as Interconnection Backbone for Multicore Chips: Promises and Challenges," IEEE Journal on Emerging and Selected Topics in Circuits and Systems, vol. 2, no. 2, pp. 228-239, 2012.
[32a] J. Lehtomaki, A. Bicen, and I. Akyildiz, "On the Nanoscale Electromechanical Wireless Communication in the VHF Band," IEEE Transactions on Communications, p. 1, 2014.
[33a] F. Dressler and F. Kargl, "Towards security in nano-communication: Challenges and opportunities," Nano Communication Networks, vol. 3, no. 3, pp. 151-160, 2012.
[34a] C. Liaskos, A. Tsioliaridou, S. Ioannidis, N. Kantartzis, and A. Pitsillides, "A Deployable Routing System for Nanonetworks," in IEEE ICC'16, 2016, pp. 1-6.
[35a] A. Tsioliaridou, C. Liaskos, E. Dedu, and S. Ioannidis, "Packet Routing in 3D Nanonetworks: A Lightweight, Linear-path Scheme," Nano Communication Networks, vol. PP, p. PP, 2017.
[36a] H. Kim and N. Feamster, "Improving network management with software defined networking," IEEE Communications Magazine, vol. 51, no. 2, pp. 114-119, 2013.
[37a] C. Liaskos, V. Kotronis, and X. Dimitropoulos, "A novel framework for modeling and mitigating distributed link flooding attacks," in IEEE INFOCOM 2016—IEEE Conference on Computer Communications, pp. 1-9.

Many advantages of the present disclosure will be fully understood from the foregoing description, and it will be apparent that various changes may be made in the form, construction and arrangement of the units and devices without departing from the scope of the present disclosure and/or without sacrificing all of its advantages. Since the embodiments can be varied in many ways, it will be recognized that the present disclosure should be limited only by the scope of the following embodiments.

The invention claimed is:

1. A system for controlling an interaction of a surface with an impinging electromagnetic wave, the system comprising:
a surface comprising a plurality of controllable elements, wherein each of the plurality of controllable elements is configured to adjust a respective electromagnetic behavior based on a control signal received by a respective controllable element, wherein the surface comprises a plurality of controller domains and each controller domain of the plurality of controller domains comprises one or more of the controllable elements of the plurality of controllable elements;
a sensing unit configured to detect a state of an environment of the surface and/or one or more wave attributes of an electromagnetic wave impinging on the surface;
a control unit configured to determine, based on the detected state of the environment and/or the one or more wave attributes, a control state of the plurality of controllable elements, in which the electromagnetic behavior of the plurality of controllable elements is adjusted such that the surface interacts with the electromagnetic wave impinging on the surface in a predefined manner; and
an adjusting unit for each controller domain, each adjusting unit being configured to determine, based on the control state determined by the control unit, control signals for the one or more controllable elements of a respective controller domain, wherein the adjusting unit for each controller domain is configured to transmit the control signals to the one or more controllable elements of the respective controller domain to cause the one or more controllable elements to adjust the respective electromagnetic behavior according to the control state, wherein each adjusting unit for each controller domain is configured relative to one another to form a network and to communicate with each other.

2. The system of claim 1, wherein each controller domain further comprises one or more sensors of the sensing unit, wherein the adjusting unit for each controller domain is configured to receive a sensor signal from the one or more sensors of the respective controller domain and to transmit a signal indicative of the sensor signal and/or indicative of the one or more wave attributes to the control unit.

3. The system of claim 1,
wherein the controllable elements form a meta-atom canvas comprising a plurality of tunable meta-atoms, and
wherein the meta-atom canvas forms an electromagnetic metasurface for the impinging electromagnetic wave.

4. The system of claim 1, wherein the plurality of controllable elements comprises at least one of:
metallic patches and CMOS- or graphene-switches arranged between the metallic patches;
MEMS actuators, and, optionally, THz designs tuned by MEMS actuators;
magnetoelastic microwave metamaterials, and, optionally, magnetoelastic microwave metamaterials configured to be driven by Ampèere's force;
reconfigurable optical metadevices based on flexible strips or nanowires cut from membranes of nanoscale thickness;
thermally reconfigurable metasurfaces configured to be driven by differential thermal expansion between gold and silicon nitride layers;
electro-optical modulator metasurface configured to be driven by electrostatic forces between oppositely charged nanowires;
all-optical modulator plasmonic metasurface configured to be actuated by a milliwatt of light power at telecom wavelengths;
spatial light modulators;
electrically addressable metadevices, randomly reconfigurable in one dimension; and
digital metasurfaces configured to be switched between two opposite electromagnetic states.

5. The system of any of claim 1, wherein the sensing unit comprises a plurality of sensors arranged on the surface.

6. The system of claim 1, wherein the sensing unit comprises at least one remote sensor arranged remote from the surface, wherein the remote sensor is configured to detect the state of the environment, and wherein the state of the environment is at least one of a position of a transmitter of the electromagnetic wave, an orientation of a transmitter of the electromagnetic wave, a mobility pattern of a transmitter of the electromagnetic wave, and a device type identification of a transmitter of the electromagnetic wave.

7. The system of claim 1, wherein the predefined manner comprises at least one of:
   wave steering into a predefined direction, and, optionally, reflecting or refracting the impinging electromagnetic wave from a given incident direction towards a direction dependent on the changed electromagnetic behavior of the controllable elements;
   lens functionality, and, optionally, focusing the impinging electromagnetic wave towards a predefined focal point;
   wave absorbing, and, optionally, ensuring minimal reflected and/or refracted power for the impinging electromagnetic wave; and
   wave polarizing, and, optionally, changing an oscillation direction of an electromagnetic field of the impinging electromagnetic wave.

8. The system of claim 1, wherein the control unit is configured to determine, based on the state of the environment and/or the one or more wave attributes detected by the sensing unit, an incident direction of the impinging electromagnetic wave with regard to the surface.

9. The system of claim 8, wherein the control unit is configured to determine the control state based on the determined incident direction, such that the electromagnetic wave is reflected towards a predefined reflection direction.

10. The system of claim 8, wherein the control unit is configured to determine the control state based on the determined incident direction, such that the electromagnetic wave is focused at a predefined focal point.

11. The system of claim 1, wherein the control unit is configured to determine the control state based on a known position of an object, wherein the control state is determined such that the electromagnetic wave, after impinging on the surface, does not impinge on a surface of the object.

12. The system of claim 11, wherein the object is located between a transmitter of the electromagnetic wave and a known position of a receiver of the electromagnetic wave, wherein the control state is determined such that a propagation path of the electromagnetic wave, after impinging on the surface, is steered around the object.

13. The system of claim 1, wherein the system further comprises a mobile device detecting unit configured to detect a presence of one or more mobile devices in the vicinity of the system, wherein the control unit is configured to determine the control state based on an output of the mobile device detecting unit.

14. The system of claim 1, wherein the surface comprises an energy harvesting antenna, which is configured to convert part of the energy of the impinging electromagnetic wave into electric energy, wherein the energy harvesting antenna is connected to the control unit and configured to supply the electric energy to the control unit.

15. The system of claim 1, wherein the control unit is configured to, in a calculated or learning process:
   determine a control state of the controllable elements,
   receive sensor data from an external and/or an internal sensor regarding the state of the environment and/or a reflected electromagnetic wave reflected on the plurality of controllable elements;
   adjust the control state of the controllable elements based on the received sensor data in a calculated or iterative process, such that the surface interacts with the impinging electromagnetic wave in a predefined manner and such that the reflected electromagnetic wave exhibits a predefined behavior;
   store information indicative of the control state in a memory of the control unit.

16. A method for controlling an interaction of a surface with an impinging electromagnetic wave, the method comprising:
   receiving an electromagnetic wave at a surface comprising a plurality of controllable elements, wherein each of the plurality of controllable elements is configured to adjust a respective electromagnetic behavior based on a control signal received by a respective controllable element, wherein the surface comprises a plurality of controller domains and each controller domain of the plurality of controller domains comprises one or more of the controllable elements of the plurality of controllable elements;
   detecting, by a sensing unit, a state of an environment of the surface and/or one or more wave attributes of the electromagnetic wave impinging on the surface;
   determining, by a control unit, based on the detected state of the environment and/or the one or more wave attributes, a control state of the plurality of controllable elements, in which the electromagnetic behavior of the controllable elements is adjusted such that the surface interacts with the electromagnetic wave impinging on the surface in a predefined manner;
   determining, by an adjusting unit for each controller domain, based on the control state, control signals for the one or more controllable elements of a respective controller domain; and
   transmitting, by the adjusting unit for each controller domain, the control signals to the one or more controllable elements of the respective controller domain to cause the one or more controllable elements to adjust the respective electromagnetic behavior according to the control state, wherein each adjusting unit for each controller domain is configured relative to one another to form a network and to communicate with each other.

* * * * *